US012657596B2

(12) United States Patent
Kunwar et al.

(10) Patent No.: US 12,657,596 B2
(45) Date of Patent: Jun. 16, 2026

(54) MACHINE LEARNING (ML)-BASED SYSTEM AND METHOD FOR PREDICTING FINANCIAL TRANSACTION PATTERNS

(71) Applicant: HIGHRADIUS CORPORATION, Houston, TX (US)

(72) Inventors: Anupam Kunwar, Hyderabad (IN); Apoorva Shrivastava, Hyderabad (IN); Sayanta Mukherjee, Hyderabad (IN); Rohit Haldar, Hyderabad (IN); Maitreya Mohapatra, Hyderabad (IN); Vineet Kumar Gupta, Hyderabad (IN)

(73) Assignee: HIGHRADIUS CORPORATION, TX (US)

( * ) Notice: Subject to any disclaimer, the term of this patent is extended or adjusted under 35 U.S.C. 154(b) by 232 days.

(21) Appl. No.: 18/305,483

(22) Filed: Apr. 24, 2023

(65) Prior Publication Data

US 2024/0354786 A1     Oct. 24, 2024

(51) Int. Cl.
*G06Q 30/00* (2023.01)
*G06Q 30/0202* (2023.01)
(52) U.S. Cl.
CPC ................................ *G06Q 30/0202* (2013.01)
(58) Field of Classification Search
CPC .................................................. G06Q 30/0202
USPC ........... 705/40, 1.1, 35, 44, 36 R, 38, 14.25; 379/266
See application file for complete search history.

(56) References Cited

U.S. PATENT DOCUMENTS 11,521,214 B1 * 12/2022 Hetrick ................ G06Q 10/107

OTHER PUBLICATIONS

ProQuestDialogNPL Search History.*
Da Costa Rebelo Susana Lopes: "Predicting Account Receivables Outcomes with Machine-Learning", , Jul. 1, 2021 (Jul. 1, 2021), pp. 1-137, XP093170390.*
ip.com NPL Search History.*

* cited by examiner

*Primary Examiner* — John H. Holly
(74) *Attorney, Agent, or Firm* — Jason C. Cameron

(57) ABSTRACT
A system and method for predicting financial transaction patterns is disclosed. The method includes receiving invoice data of one or more customers. The method further includes receiving granularity levels, thereby generating a set granularity level instances based on various invoice data attributes. The method further computes payment frequency bucket features for all the generated set of granularity level instances and assigns invoices to clusters based on the set of payment frequency bucket features. The set of payment frequency bucket features assigns a customer to be one of: a weekly payer, alternative weekly payer, a monthly payer, a bi-monthly, a quarterly payer, a half yearly payer and an annual payer. The method further includes the generation of a set of payment pattern features based on the set of payment frequency bucket features of the cluster. Further, the method includes selection of an optimal pattern with highest probability of adherence.

16 Claims, 9 Drawing Sheets

100

Electronic devices 110

ML-Based Computing
System 102

External Database 108

Network
106

Plurality of Modules
104

ML-Based Computing System 102

Memory 208

Plurality of modules 104

Data receiver module 210

Granularity level instance creation module 212

Payment frequency computation module 214

Payment pattern generation module 216

Payment pattern selection module 218

Data prediction module 220

Data output module 222

System Bus 206

Storage Unit 204

Hardware Processor(s) 202

212

RECEIVE HISTORICAL INVOICE DATA 302

CONFIGURE A SET OF GRANULARITY LEVELS  304

CREATE A SET OF GRANULARITY LEVEL INSTANCES 306

214

RECEIVE INVOICE DATA 402

COMPUTE A SET OF PAYMENT FREQUENCY BUCKET FEATURES 404

ASSIGN INVOICES TO CLUSTERS 406

216

RECEIVE A SET OF PAYMENT FREQUENCY
BUCKET FEATURES BASED CLUSTERED TRAIN
DATA 502

GENERATE
DATE-SHIFT-PAYMENT-PATTERN FEATURES 504

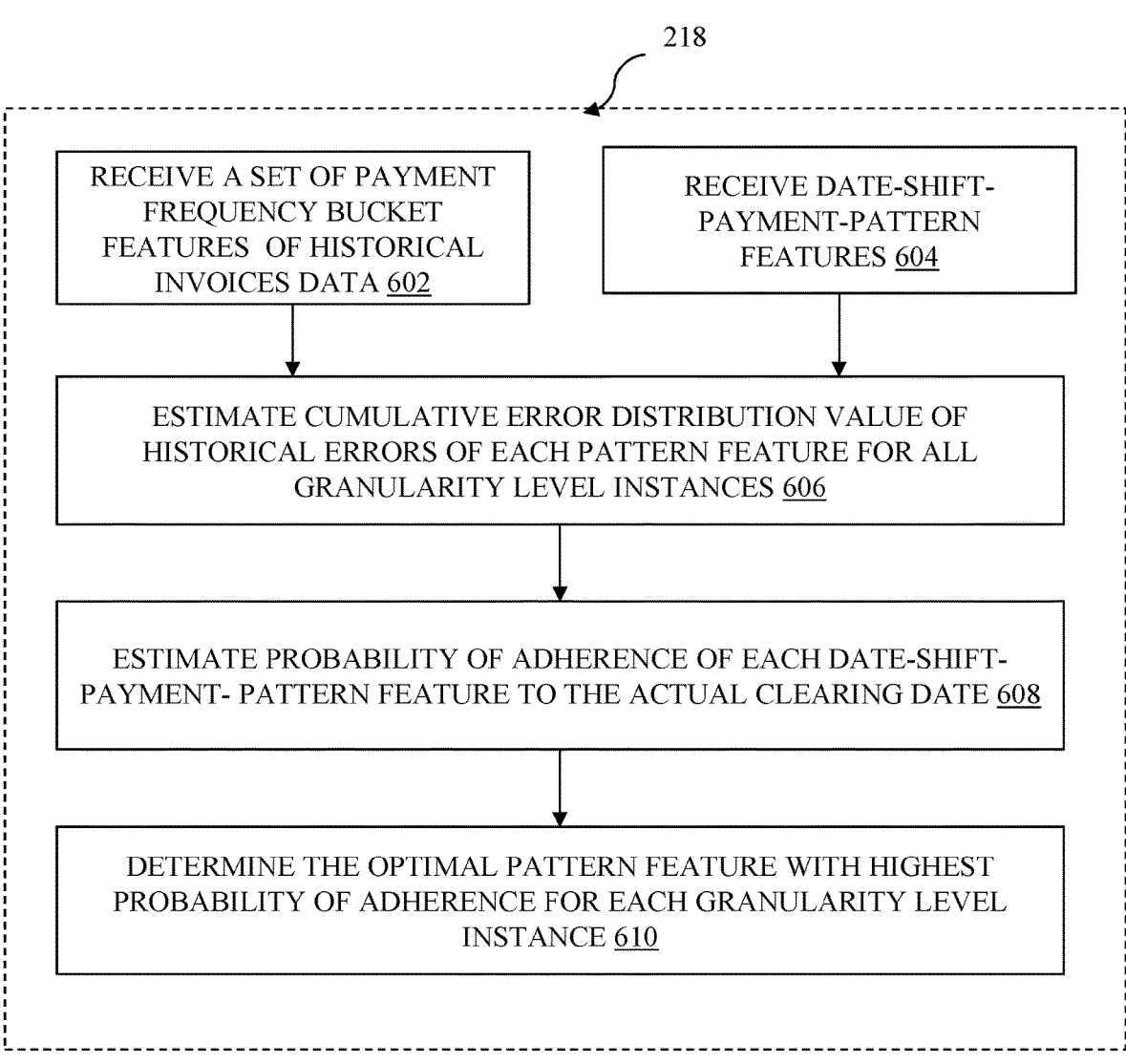

218

RECEIVE A SET OF PAYMENT FREQUENCY BUCKET FEATURES OF HISTORICAL INVOICES DATA 602

RECEIVE DATE-SHIFT-PAYMENT-PATTERN FEATURES 604

ESTIMATE CUMULATIVE ERROR DISTRIBUTION VALUE OF HISTORICAL ERRORS OF EACH PATTERN FEATURE FOR ALL GRANULARITY LEVEL INSTANCES 606

ESTIMATE PROBABILITY OF ADHERENCE OF EACH DATE-SHIFT-PAYMENT- PATTERN FEATURE TO THE ACTUAL CLEARING DATE 608

DETERMINE THE OPTIMAL PATTERN FEATURE WITH HIGHEST PROBABILITY OF ADHERENCE FOR EACH GRANULARITY LEVEL INSTANCE 610

DETERMINE AN OPTIMAL PATTERN WITH HIGHEST PROBABILITY TO THE ACTUAL HISTORICAL PAYMENT PATTERN FOR A PARTICULAR CUSTOMER OF A GRANULARITY LEVEL INSTANCE.          814

PREDICTA PAYMENT DATE FOR THE SET OF OPEN INVOICES.          816

DISPLAY, THE PREDICTED PAYMENT DATE ON USER INTERFACE SCREEN OF ONE OR MORE ELECTRONIC DEVICES ASSOCIATED WITH A USER.          818

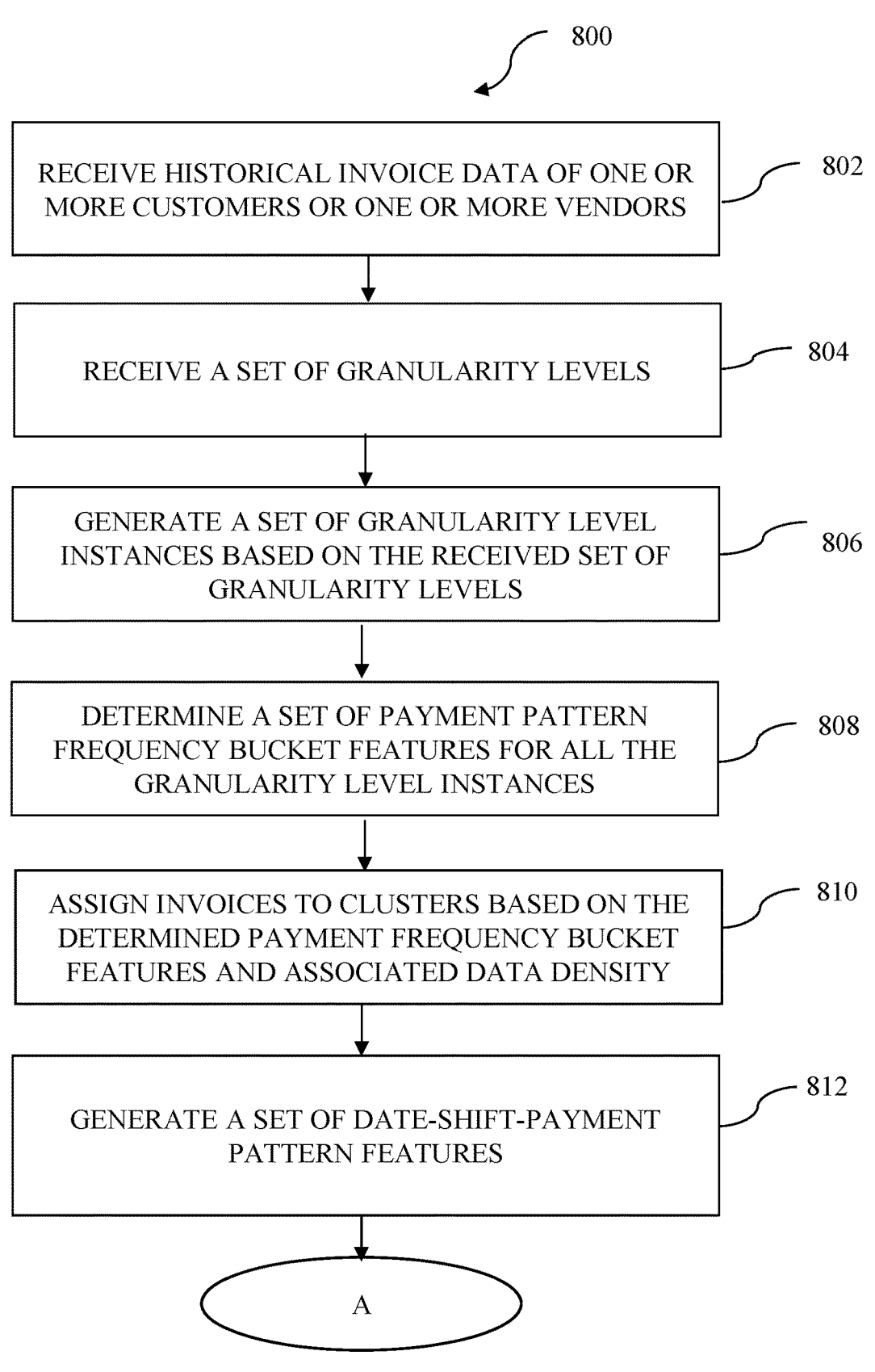

800

RECEIVE HISTORICAL INVOICE DATA OF ONE OR MORE CUSTOMERS OR ONE OR MORE VENDORS — 802

RECEIVE A SET OF GRANULARITY LEVELS — 804

GENERATE A SET OF GRANULARITY LEVEL INSTANCES BASED ON THE RECEIVED SET OF GRANULARITY LEVELS — 806

DETERMINE A SET OF PAYMENT PATTERN FREQUENCY BUCKET FEATURES FOR ALL THE GRANULARITY LEVEL INSTANCES — 808

ASSIGN INVOICES TO CLUSTERS BASED ON THE DETERMINED PAYMENT FREQUENCY BUCKET FEATURES AND ASSOCIATED DATA DENSITY — 810

GENERATE A SET OF DATE-SHIFT-PAYMENT PATTERN FEATURES — 812

MACHINE LEARNING (ML)-BASED SYSTEM AND METHOD FOR PREDICTING FINANCIAL TRANSACTION PATTERNS

FIELD OF INVENTION

Embodiments of the present disclosure relate to Machine Learning (ML)-based processing systems and more particularly relates to a ML-based system and a method for predicting financial transaction patterns.

BACKGROUND

Predicting financial transaction patterns for accounts receivable is extremely important due to several reasons, such as for cash flow management, invoice management, credit-risk management and determining the collection strategy.

Further, the number of payment transactions occurring in a financial system is constantly increasing. Identifying usual and unusual patterns of behavior is crucial to monitor the safe and efficient functioning of payment transactions. Advancements in technology have further led to the invention of machine-learning methodologies which have demonstrably learned complex patterns and can provide accurate data representations. In the context of payment transactions, machine learning is leading the development of automated monitoring tools that enhance the ability of financial systems to supervise and oversee payment transactions.

Conventional techniques of payment transactions used to predict payment pattern and date use either of the following two approaches: (a) Simple customer level average of historical difference between the due date and clearing date or (b) conventional tree-based algorithms such as decision tree, random forest, and the like.

However, accuracy and efficiency regarding the predictions are not possible with conventional tree-based approaches, as there is minimal control over how the trees get split during the training of the algorithm.

Moreover, the conventional tree-based approaches take a significant amount of time for 1 cycle of train and predict for a dataset of volume larger than 5 million records.

Additionally, the accuracies of the present invention are greater than or equal to the conventional methods. In the further embodiments of the disclosure tabular depictions show a comparison of accuracies between average delay approach and the present invention evaluated over a period of 12 run dates.

Therefore, in order to address the aforementioned issues, there is a need for an improved Machine Learning (ML)-based computing system and method for detecting financial transaction payment patterns and predicting payment dates.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a Machine Learning (ML)-based computing system and method for predicting financial transaction payment patterns is disclosed. The ML-based computing system includes one or more hardware processors and a memory coupled to the one or more hardware processors. The memory includes a plurality of modules in the form of programmable instructions executable by the one or more hardware processors. The plurality of modules includes a data receiver module configured to receive invoice data of at least one of one or more customers and one or more vendors from an external database. The invoice data comprises a set of closed invoices and a set of open invoices. The invoice data may further include one or more of customer number, payment terms, invoice date, baseline date, due date, discount due date, clearing date, posting date, invoice type, business unit within a company, invoice amount, discount amount percentage, payment block status and the like. Further, the set of open invoices correspond to the invoices, wherein the payment transactions are yet to occur. The set of closed invoices correspond to the invoices, wherein the payment transactions have previously occurred. The invoice data entries are considered to be the input to the ML-based computing system in general and plurality of modules in specific. The payment transactions correspond to any act, initiated by the payer or on his behalf or by the payee, of placing, transferring, or withdrawing funds, irrespective of any underlying obligations between a payer and a payee. The payer corresponds to the person or organization that gives someone money that is due for work done, goods received, or a debt incurred. The payee is a person or organization that receives payment for goods or services.

The plurality of modules further includes a granularity level instance creation module. The granularity level instance creation module extracts a set of granularity levels from the received invoice data based on data density, volume, and the set of data attributes, wherein the set of granularity levels comprises at least one of customer name, company code, customer number payment terms, business unit level, invoice types and the like. The set of granularity levels may also comprise a combination of individual granularity levels such as customer name, company code, customer number payment terms, business unit level, invoice types. The granularity level instance creation module further generates a set of granularity level instances based on the extracted set of granularity levels. Each of the set of granularity level instances corresponds to a basic logical unit for which payment transaction pattern is to be determined. For example—If the set of granularity level is extracted as ['company code', 'customer number', payment term]: the set of granularity level instances generated will be ['1200'|'1000'|'NET30;], [1200'|'1000'|'NET60']. ['5600'|'2000'|'NETPROX'], ['1234'|'3000'|'NETDISC'].

The plurality of modules further includes a payment frequency computation module configured to compute a payment frequency bucket feature for each of the set of granularity level instances. The payment frequency is a measure of the number of distinct payment transactions observed corresponding to an invoice due week. For example: If a customer or vendor makes a payment transaction in one week corresponding to the invoices due in four different weeks, at one go, then the payment transaction is considered to exhibit once-a-month payment frequency bucket feature. Further, each of the set of granularity level instances belongs to at least one of the following buckets: a weekly payer, an alternative week payer, a once-a-month payer, quarterly payer, a half-yearly payer, a yearly payer, and the like. Each of the set of granularity instances may further be assigned to a sub-payment frequency bucket such as month-start payer, month-end payer, first Monday of the month payer and the like. Furthermore, the payment frequency bucket feature further assigns the set of closed invoices to a set of clusters based on the determined payment frequency bucket features and the data density.

The plurality of modules further includes a payment pattern generation module configured to dynamically generate a set of date-shift-payment pattern features based on the determined set of payment frequency bucket features assigned to the set of clusters. The payment pattern generation module generates the set of date-shift-payment-pattern features by shifting a set of invoice level date attributes comprising of at least one of discount date, due date, clearing date and invoice date to a set of reference points on a calendar, based on the determined payment frequency bucket features of the set of clusters. Each of the set of date-shift-payment-pattern features indicates a determined date on which payment transaction can potentially occur for each of the set of open invoices.

The plurality of modules further includes a payment pattern selection module, configured to determine an optimal pattern from among the generated set of date-shift-payment pattern features, with the highest probability of adherence, for each granularity level instance utilizing a customer pattern adherence process. The payment pattern selection module takes as input the historical data comprising of the payment frequency bucket feature based clustered training data along with the set of date-shift-payment-pattern features and estimates the cumulative error distribution of historical errors of each of the set of date-shift-payment-pattern features for each of the set of granularity level instances. Further, the payment pattern selection module estimates a probability of adherence on comparison of each of the set of date-shift-payment-pattern features to an actual clearing date based on the estimated cumulative error distribution value of historical errors. Furthermore, the payment pattern selection module selects an optimal pattern from the set of date-shift-payment patterns for each of the set of granularity-level-instances. Moreover, at least one optimal pattern is selected for each of the set granularity-level instances. Distinct optimal patterns are selected corresponding to each of the distinct set of date-shift-payment patterns. An optimal pattern corresponds to a pattern with the highest probability of adherence for a granularity-level-instance.

The plurality of modules further includes a date prediction module configured to predict a financial transaction payment pattern for the set of open invoices based on the optimal pattern, the set of date-shift-payment pattern features and the set of granularity level instances by using a financial-transaction-pattern-prediction-based ML model. The financial-transaction-pattern-prediction-based ML-model used for predicting the financial transaction payment pattern in the data prediction module uses a regression-based ML-model. In another embodiment, the regression-based ML-model may include one or more of simple linear regression models, multiple linear regression models, polynomial regression models, support vector regression models, decision tree regression models, random forest regression models, and the like.

The financial transaction payment pattern comprises an estimated date at which the one or more customers and the one or more vendors complete a financial transaction to clear the set of open invoices. Each of the set of open invoices comprises of a distinct predicted payment date corresponding to each of the set of granularity-level instances.

Additionally, the plurality of modules includes a data output module configured to output the financial transaction payment pattern on the user interface screen of the one or more electronic devices associated with the one or more users.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 6 is a flowchart illustrating an exemplary process of selecting an optimal pattern by a payment pattern selection module, in accordance with an embodiment of the present disclosure:

Figure 1:
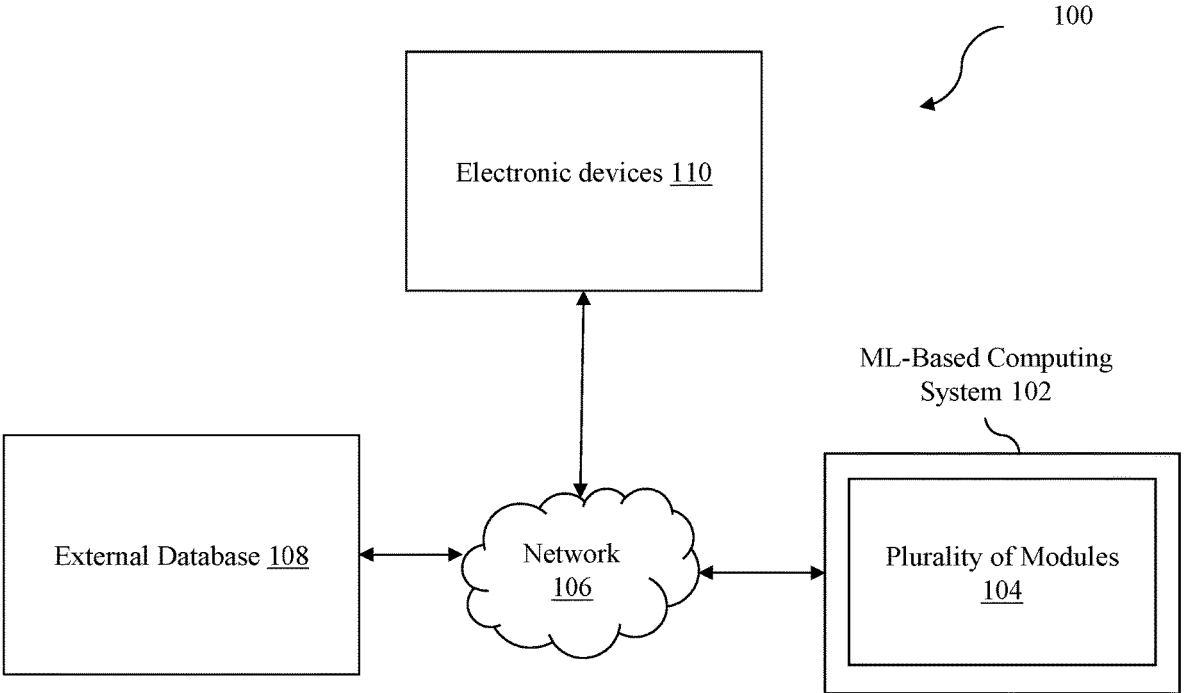
FIG. 1 is a block diagram illustrating an exemplary computing environment comprising of ML-based system and a method for predicting financial transaction patterns, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

The purpose of this invention is to predict a financial transaction payment pattern including a specific payment date with high explicability of results and significantly lower training and prediction time compared to its conventional counterparts. The present invention additionally provides faster payment pattern identification and quick identification of change in payment pattern detection.

The predicted payment pattern of financial transactions would help the collections team of a business in more efficient and insight driven planning of their collections processes, and better optimization of their working capital and DSO (days sales outstanding). The day's sales outstanding corresponds to a measure of the average number of days taken by a company to collect payment for a sale. The predicted payment pattern of financial transactions also drives high-accuracy cash forecasts, capturing efficiently the seasonality by identifying the payment patterns corresponding to different customers, vendors, payment terms, and invoice types.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 comprising of ML-based system and method for predicting financial transaction patterns, in accordance with an embodiment of the present disclosure. According to FIG. 1, the computing environment 100 includes one or more electronic devices 110 associated with one or more users communicatively coupled to a Machine Learning (ML)-based computing system 102 via a network 106. In an exemplary embodiment of the present disclosure, the one or more users may include one or more customers, one or more vendors, individuals belonging to firms involving payment transactions, individuals belonging to business firms, merchants and the like. Furthermore, the one or more electronic devices 110 are used by the one or more users to attain at least one of: generation of invoice data and receiving a set of payment prediction patterns and dates on the user interface screen of the one or more electronic devices 110 and the like. The ML-based computing system 102 may be hosted on a central server, such as a cloud server or a remote server. Further, the network 106 includes a Wireless-Fidelity (Wi-Fi) connection, a hotspot connection, a Bluetooth connection, a local area network, a wide area network or any other wireless network. In an exemplary embodiment of the present disclosure, the one or more electronic devices 110 may include a laptop computer, desktop computer, tablet computer, smartphone, wearable device, smart watch, and the like.

Further, the computing environment 100 includes an external database 108 communicatively coupled to the ML-based computing system 102 via the network 106. The external database 108 includes the invoice data comprising of both a set of open invoices and a set of closed invoices. The invoice data may include at least one of customer number, payment terms, invoice date, baseline date, due date, discount due date, clearing date, posting date, invoice type, business unit within a company, invoice amount, discount amount percentage, payment block status, or a combination thereof. The set of open invoices corresponds to the invoices associated with payment transactions which are yet to occur. The set of closed invoices corresponds to the invoices associated with payment transactions that previously occurred. In an embodiment of the present disclosure, the set of closed invoices are fetched from the external database 108 to train a financial-transaction-pattern-prediction-based ML model. The financial-transaction-pattern-prediction-based ML model is trained to facilitate the prediction of financial transaction patterns of the one or more customers or one or more vendors. The ML-based computing system 102 includes a plurality of modules 104 communicatively coupled to the other components of the computing environment 100 via the network 106. In an embodiment of the present disclosure, the ML-based computing system 102, inclusive of the plurality of modules 104 predicts a financial transaction pattern thereby predicting a payment date for a set of open invoices. The payment transaction corresponds to any act, initiated by the payer or on his behalf or by the payee, of placing, transferring or withdrawing funds, irrespective of any underlying obligations between a payer and a payee. The payer corresponds to the person or organization that gives someone monetary payment that is due for work done, goods received, or a debt incurred. The payee is a person or organization that receives monetary payment for goods or services.

Furthermore, the one or more electronic devices 110 include a local browser, a mobile application, or a combination thereof. Furthermore, the one or more users may use a web application via the local browser, the mobile application, or a combination thereof to communicate with the ML-based computing system 102. In an embodiment of the present disclosure, the ML-based computing system 102 includes a plurality of modules 104. Details on the plurality of modules 104 have been elaborated in subsequent paragraphs of the present description with reference to FIG. 2. All of the aforementioned subsystems within the ML-based computing system 102 enable the automatic prediction of financial transaction patterns for open invoices based on one or more date-shift-payment-pattern features.

In an embodiment of the present disclosure, the ML-based computing system 102 is configured to receive the invoice data of at least one of one or more customers and one or more vendors from the external database 108, through the one or more electronic devices 110 associated with the one or more users. The invoice data comprises the set of closed invoices and the set of open invoices along with the set of associated data attributes. The set of associated attributes comprises at least one of, but not limited to, customer number, payment terms, invoice date, baseline date, posting date, due date, discount due date 1/2/3, clearing date, invoice type, invoice amount, discount amount 1/2/3, business unit and payment block status. Further, the ML-based computing system 102 is configured to extract the set of granularity levels from the received invoice data based on data density, volume, and the set of data attributes. The set of granularity levels comprise at least one of company code, customer number, payment terms and the like. The granularity can be optimally tracked at company code or business unit level, or can be more granular at customer of company code, or at payment term of a customer The ML-based computing system 102 is further configured to generate a set of granularity level instances based on the extracted set of granularity levels. The generated set of granularity level instances are identifiers of all the entities that belong to the configured granularity level. For Example: CompanyCode: 1|CustomerNo: 123, Company Code: 1|CustomerNo: 234, and the like, in case the configured Granularity Level is: Company Code+CustomerNumber. Each of the set of granularity level instances correspond to a basic logical unit for which payment transaction patterns are to be determined. Furthermore, The ML-based computing system 102, is configured to compute a payment frequency bucket feature for each of the set of granularity level instances. The set of granularity level instance corresponds to at least one of the following buckets: a weekly payer, an alternative week payer, once-a-month payer, and a quarterly payer. Further, the ML-based computing system 102 assigns the set of closed invoices to a set of clusters based on the determined payment frequency bucket features and the data density. A "closed invoice" is an invoice that has been processed and paid. The one or more customers are grouped on various factors such as type of payer, receipt period, lookback period, invoice volume, monetary amount and the like. In one embodiment, the set of closed invoices may be clustered on the basis of receipt period. For example—the invoices received on a particular day, week, month, quarter or year may be grouped in one cluster. In another embodiment, the set of closed invoices may be clustered on the basis of frequency or volume of the set invoices generated for a payer. For example—if more than 15 invoices are generated in a month for payer A and payer B, then payer A and payer B belong to one cluster. If less than 15 invoices are generated in a month for payer C and payer D, then payer C and payer D belong to another cluster. In another embodiment, the closed invoices may be clustered on the basis of monetary amount. For example—invoices having an amount of USD 1000 or above may be classified in one cluster, and invoices having an amount below USD 1000 may be classified in another cluster. The set of open invoices or the set of closed invoices corresponding to the granularity level instances belonging to the same frequency bucket are grouped within one cluster. Low volume and density clusters are further grouped with their immediate higher frequency bucket. The ML-based computing system 102 is configured to dynamically generate a set of date-shift-payment pattern features based on the determined set of payment frequency bucket features assigned to the set of clusters.

The ML-based computing system 102 is further configured to determine an optimal pattern from among the generated set of date-shift-payment pattern features with a highest probability of adherence for each granularity level instance using a customer pattern adherence process. Furthermore, the ML-based computing system 102, is configured to predict a financial transaction payment pattern for the set of open invoices based on the optimal pattern, the set of date-shift-payment pattern features and the set of granularity level instances by using the financial-transaction-pattern-prediction-based ML model. The financial transaction payment pattern obtained from the financial-transaction-pattern-prediction-based ML model includes an estimated date at which the one or more customers and the one or more vendors are probable to complete a financial transaction to clear the set of open invoices. The ML-based computing system 102, is further configured to output a financial transaction payment pattern on the user interface screen of the one or more electronic devices 110 associated with the one or more users. The financial transaction payment model comprises of a date for each invoice on which the payment transaction can probably occur.

Figure 2:
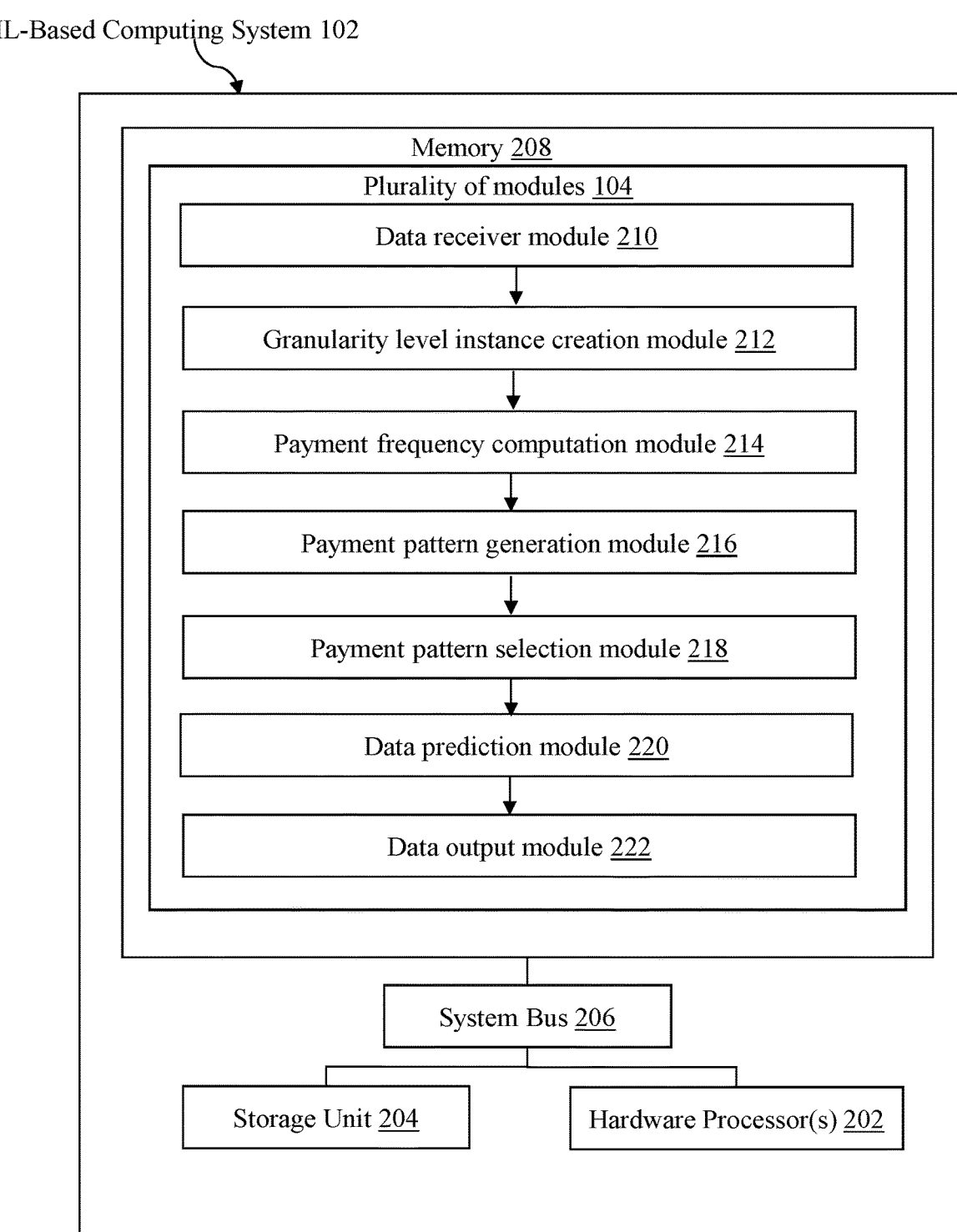
FIG. 2 is a block diagram illustrating an exemplary Machine Learning (ML)-based computing system, such as shown in FIG. 1, capable of facilitating prediction of financial transaction patterns, in accordance with an embodiment of the present disclosure.

FIG. 2 is a block diagram illustrating an exemplary Machine Learning (ML)-based computing system, such as shown in FIG. 1, capable of facilitating prediction of financial transaction patterns, in accordance with an embodiment of the present disclosure. Further, the ML-based computing system 102 includes one or more hardware processors 202, a memory 208 and a storage unit 204. The one or more hardware processors 202, the memory 208 and the storage unit 204 are communicatively coupled through a system bus 206 or any similar mechanism. The memory 208 comprises the plurality of modules 104 in the form of programmable instructions executable by the one or more hardware processors 202. Further, the plurality of modules 104 includes a data receiver module 210, a granularity level instance creation module 212, a payment frequency computation module 214, a payment pattern generation module 216, a payment pattern selection module 218, a data prediction module 220 and a data output module 222.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

In another aspect, a non-transitory computer-readable storage medium having instructions stored therein that, when executed by the one or more hardware processor, cause the one or more hardware processors to perform method steps as described in the embodiments of the present disclosure.

The memory 208 may be non-transitory volatile memory and non-volatile memory. The memory 208 may be coupled for communication with the one or more hardware processors 202, such as being a computer-readable storage medium. The one or more hardware processors 202 may execute machine-readable instructions and/or source code stored in the memory 208. A variety of machine-readable instructions may be stored in and accessed from the memory 208. The memory 208 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 208 includes the plurality of modules 104 stored in the form of machine-readable instructions on any of the above-mentioned storage media and may be in communication with and executed by the one or more hardware processors 202.

The storage unit 204 may be a cloud storage, a Structured Query Language (SQL) data store or a location on a file system directly accessible by the plurality of modules 104. The storage unit 204 may store historical invoice data inclusive of both set of open invoices and a set of closed invoices, related invoice level attributes, a set of granularity levels, a set of granularity level instances, a set of payment frequency bucket features, the set of date-shift-payment pattern features, optimal payment patterns, highest adhering patterns, predicted payment dates and the like.

The data receiver module 210 is configured to receive invoice data of at least one of one or more customers and one or more vendors from the external database 108. The invoice data comprises a set of closed invoices and a set of open invoices along with a set of data attributes. Further, the invoice data may include at least one of customer number, payment terms, invoice date, baseline date, due date, discount due date, clearing date, posting date, invoice type, business unit within a company, invoice amount, discount amount percentage, payment block status, or a combination thereof. Furthermore, the set of open invoices correspond to the invoices associated with payment transactions which are yet to occur. The set of closed invoices correspond to the invoices associated with payment transactions previously occurred. The granularity level instance creation module 212, is configured to extract a set of granularity levels from the received invoice data based on data density, volume, and the set of data attributes. The set of granularity levels comprises at least one of company code, customer number, payment terms and the like i.e., the granularity can be tracked at company code or business unit level, or it can be more granular at customer of company code, or even at payment term of a customer. Further, the granularity level instance creation module 212 generates a set of granularity level instances based on the extracted set of granularity levels. The set of granularity level instances are identifiers of all the entities that belong to a configured granularity level. Each of the set of granularity level instances correspond to a basic logical unit for which payment transaction pattern is to be determined. The payment pattern detection is evaluated for each granularity level instance, independently of other granularity level instances For example—If granularity level is set as ['company code', 'customer number', payment term']: the set of granularity level instances generated will be ['1200'|'1000'|'NET30'], [1200'|'1000'|'NET60'], ['5600'|'2000'|'NETPROX'], ['1234'|'3000'|'NETDISC']. The above stated exemplary embodiment is depicted in Table.1.

TABLE 1

| Invoice ID | Company code | Customer number | Invoice payment term | Granularity level instances |
|---|---|---|---|---|
| 1 | 1200 | 1000 | NET30 | 1200\|1000\|NET30 |
| 2 | 1200 | 1000 | NET60 | 1200\|1000\|NET60 |
| 3 | 5600 | 2000 | NETPROX | 5600\|2000\|NETPROX |
| 4 | 1234 | 3000 | NETDISC | 1234\|3000\|NETDISC |

With reference to Table. 1, the term Invoice ID refers to a unique identifier for invoice transactions. The company code is the identifier for the logical business unit of a company under which an open invoice has been issued. Further, the invoice payment terms are defined as contractually-agreed terms of payment between a business and one or more customers. Commonly, invoice payment terms or, more simply, payment terms, refer to a payment due date, relative to the date in which goods or services were delivered, or when an invoice for those goods or services was delivered. There are multiple types of payment terms depending on the company and business. Some common examples of Payment Terms are: NET30, NET60, NETPROX, NETDISC, and the like. "NETdays" is an invoice payment terminology representing the payment due date, relative to the date goods or services have been delivered. For instance, NET30 elucidates that the payment date will be 30 days after an invoice creation date. NET60 elucidates that the payment date will be 60 days after an invoice creation date. A payment term of NETPROX 30 indicates that payment is due on the 30th day of the next month. NETDISC 1% 30 elucidates that a percentage of payable amount will reduce if the payment has been made before 30 days.

The payment frequency computation module 214 is configured to compute a payment frequency bucket feature for each of the set of granularity level instances. The payment frequency bucket features correspond to one of: a customer and a vendor to be one of: a weekly payer, alternative weekly payer, a monthly payer, a bi-monthly, a quarterly payer, a half yearly payer and an annual payer, and the like. Further, the payment frequency computation module 214 assigns the set of closed invoices to a set of clusters based on the determined payment frequency bucket features and the data density. A set of clusters comprises invoices based on the payment frequency bucket features and the data density corresponding to the respective granularity-level-instances. In order to compute a payment frequency bucket feature for each of the set of granularity level instances and assign the set of granularity level instances to a set of clusters, the following steps are followed. In the first step, the payment frequency computation module 214 is configured to evaluate the relationship between count of payment weeks and due weeks on the historical invoice data with respect to multiple sets of lookback periods. In the second step, the payment frequency computation module 214 is configured to classify the granularity level instances into the determined payment frequency bucket features based on the evaluated relationship. In the third step, the payment frequency computation module 214 is configured to assign the set of closed invoices to the set of clusters based on the determined payment frequency bucket features and the data density. Additionally, the payment frequency computation module 214 assigns the one or more customers or one or more vendors to be at least one of: a weekly payer, alternative weekly payer, a monthly payer, a bi-monthly, a quarterly payer, a half yearly payer, an annual payer, and the like.

The payment pattern generation module 216 is configured to dynamically generate a set of date-shift-payment pattern features based on the determined set of payment frequency bucket features assigned to the set of clusters. The payment pattern generation module 216 is configured to generate the set of date-shift-payment-pattern features by shifting a set of invoice level date attributes comprising at least one of: discount date, due date, clearing date and invoice date to a set of reference points on the calendar based on the determined payment frequency bucket features of the set of clusters. Each of the set of date-shift-payment-pattern features indicates a date on which payment transaction is set to occur for each of the set of open invoices.

In an exemplary embodiment of the present disclosure, the process of generation of the set of date-shift-payment pattern features is as follows. Suppose there are 2 patterns generated for the input data. The first is, payment pattern feature1 that is month end shift. The month end shift predicts the end of the due month of an invoice as the possible payment date. Time period of 1 cycle is equal to 28 days. The second is payment pattern feature2, the quarter end shift. The quarter end shift predicts the end of the due quarter of an invoice as the possible payment date. Time period of 1 cycle is equal to 91 days The resultant output posts a feature engineering on the invoice data would be as follows:

TABLE 2

| In-voice ID | Granularity level Instances | Invoice Details | | | Possible/Candidate | |
| | | In-voice date | Due date | Clear-ing date | Payment Dates | |
| | | | | | Month end shift | Quarter end shift |
| 1 | abc | 2021 Jan. 1 | 2021 Mar. 15 | 2021 Feb. 15 | 2021 Mar. 31 | 2021 Mar. 31 |
| 2 | abc | 2021 Feb. 1 | 2021 Apr. 1 | 2021 Apr. 30 | 2021 Apr. 30 | 2021 Jun. 30 |
| 3 | def | 2021 Mar. 1 | 2021 Mar. 15 | 2021 Apr. 1 | 2021 Mar. 31 | 2021 Mar. 31 |

In the above example illustrated in Table. 2, the due date of invoice ID=1 is 2021-03-15, so, for month end logic the candidate payment date ended up being 2021-03-31, and quarter end ended up being 2021-03-31.

The payment pattern selection module 218 is configured to determine an optimal pattern from among the generated set of date-shift-payment pattern features with the highest probability of adherence, for each granularity level instance, using a customer pattern adherence process. In order to determine an optimal pattern from among the generated set of date-shift-payment pattern features with the highest probability of adherence for each granularity level instance using a customer pattern adherence process, the payment pattern selection module 218 executes the following steps. In the first step, the historical invoice data comprising the payment frequency bucket feature based clustered training data and the set of date-shift-payment-pattern features are obtained by the payment pattern selection module 218. In the second step, the cumulative error distribution value of historical errors is estimated for each of the set of date-shift-payment-pattern features corresponding to each of the set of granularity level instances. In order to estimate the cumulative error distribution value of historical errors the payment pattern selection module 218 is configured to execute the following steps. In the first step the payment pattern selection module 218 determines an adherence evaluation window for a particular customer, The adherence evaluation window comprises a lower bound value and an upper bound value. For example, adherence_eval_window←[lower_bound, upper_bound]. In the second step, the payment pattern selection module 218, determines a lookback period for each of the set of date-shift-pattern-feature based on the time period of each of the date-shift-pattern-feature. For example, for a month-end pattern shift feature where all the invoices due in a month get paid at the last day of the month in one-go, the set of date-shift-pattern-feature consists of a lookback which is a multiple of its time period, (i.e., 30 days). At the end of the second step, each date-shift-pattern-feature will consist of the lookback period mapped, for which the cumulative error distribution value estimation will be determined. In the third step, for each date-shift-pattern-feature, invoices cleared within the lookback period for each of the set of corresponding date-shift-payment features are filtered. For the filtered invoices, the cumulative error distribution value by revenue is computed for that date shift payment pattern features against the actual clearing date of the Invoices. In the third step, for each of the set of date-shift-pattern-feature's the cumulative error distribution value, the revenue percentage received within the adherence evaluation window is computed.

The cumulative error distribution value of historical errors corresponds to the revenue concentration levels in the determined adherence evaluation window. Furthermore, the payment pattern selection module 218 estimates the cumulative error distribution value of the historical errors based on the determined lookback pattern mapping value, by the following steps. In the first step the payment pattern selection module 218 filters the set of closed invoices based on the lookback period of the lookback pattern mapping value. The set of closed invoices cleared within the lookback period are filtered. In the second step the payment pattern selection module 218 calculates a gap between clearing date and a pattern date for each of the patterns in the determined lookback pattern mapping value. In the third step, the payment pattern selection module 218 calculates a sum amount and a cumulative sum amount for each calculated gap and the granularity level instance. In the fourth step, the payment pattern selection module 218 estimates the cumulative error distribution value of historical errors by calculating the revenue percentage at each stage respective to historical revenue of the granularity level instance in the lookback period as illustrated in Table. 3.

TABLE 3

| Gap_<pattern_i> | GLI-1 | GLI-2 | GLI-N |
| --- | --- | --- | --- |
| −8 | 1% | 10% | 0.1% |
| −7 | 70% | 20% | 50% |
| — | — | — | — |
| 8 | 90% | 60% | 90% |

In the fifth step, the payment pattern selection module 218 calculates the revenue concentration levels in the determined adherence evaluation window for each of the customers in the estimated cumulative error distribution value of historical errors as illustrated in Table. 4. The result of the previous step provides granularity-level-instance revenue consistency for each pattern.

TABLE 4

| Granularity | Revenue Concentrations in ADHERENCE_EVAL_WINDOW | | |
|---|---|---|---|
| level instances | Pattern1 | Pattern2 | PatternN |
| GLI-1 | 80% | 20% | 90% |
| GLI-2 | 10% | 10% | 100% |
| GLI-N | 90% | 50% | 60% |

The payment pattern selection module 218 is configured to estimate a probability value of adherence for each of the set of date-shift-payment-pattern features by comparing each of the set of date-shift-payment-pattern features with an actual clearing date based on the estimated cumulative error distribution value of historical errors.

Furthermore, the payment pattern selection module 218 is configured to determine the optimal pattern from the set of date-shift-payment patterns. The optimal pattern corresponds to a pattern with highest probability of adherence for each of the set of granularity level instances. To determine the optimal pattern from the set of date-shift-payment patterns, the payment pattern selection module 218 is configured to select the optimal pattern with maximum revenue pattern or optimal pattern, on the basis of which the predictions are made for all open invoices for a particular granularity-level-instance.

TABLE 5

| Granularity level instances | Pattern Selected or optimal pattern |
|---|---|
| GLI-1 | PatternN |
| GLI-2 | PatternN |
| GLI-N | Pattern1 |

The payment pattern selection module 218 is configured to determine an optimal pattern from among the generated set of date-shift-payment pattern features with the highest probability of adherence for each granularity level instance using a customer pattern adherence process. The customer pattern adherence process utilized in the present invention is further construed to possess the ability of fast detection of change in payment patterns. The customer pattern adherence process possesses a compute time significantly lower than the conventional approaches, therefore it is feasible to retain the financial-transaction-pattern-prediction-based ML model on a higher frequency to capture change in payment patterns. Additionally, the algorithm considers the periodicity and time of different patterns into consideration while determining the lookback for each pattern, which further speeds up the pattern change detection.

The customer pattern adherence process utilized in the present invention is further construed to possess high accuracies which are better or on par with conventional approaches. The accuracies of the present invention are generally greater than or equal to the traditional methods. The following table shows a comparison of accuracies between average delay approach and the approach of the present invention evaluated over a period of 12 run dates:

TABLE 6

| | ADTP (6 WK LB) | | ADTP (12 WK LB) | | Day Lvl Inv % | |
|---|---|---|---|---|---|---|
| STDEV | 3.16 | 2.53 | 3.08 | 3.33 | 2.78 | 2.03 |
| AVG | 38.96 | 62.05 | 35.83 | 60.82 | 61.38 | 82.61 |
| Min | 33.41 | 57.68 | 29.35 | 55.72 | 57.44 | 79.17 |
| 10 Perc | 34.61 | 59.65 | 32.89 | 57.22 | 58.23 | 80.56 |
| 30 Perc | 43.17 | 64.86 | 39.02 | 65.15 | 65.31 | 85.42 |
| Max | 43.55 | 65.94 | 39.87 | 66.82 | 65.72 | 85.84 |

| run_date | Open Invoices | Closed But Were Open Invoices | +/−3 D | +/−8 D | +/−3 D | +/−8 D | +/−3 D | +/−8 D |
|---|---|---|---|---|---|---|---|---|
| 2021 Mar. 22 | 41 | 9210 | 38.05% | 64.93% | 39.10% | 62.29% | 61.67% | 81.05% |
| 2021 Mar. 15 | 37 | 9672 | 41.04% | 64.12% | 35.77% | 57.15% | 60.62% | 82.37% |
| 2021 Mar. 8 | 37 | 9149 | 38.57% | 59.74% | 39.87% | 59.42% | 63.54% | 81.77% |
| 2021 Mar. 1 | 31 | 9470 | 40.76% | 60.35% | 36.60% | 55.72% | 59.35% | 81.15% |
| 2021 Feb. 22 | 29 | 8267 | 36.23% | 59.63% | 34.51% | 60.12% | 60.01% | 79.17% |
| 2021 Feb. 15 | 25 | 9621 | 34.42% | 60.92% | 29.35% | 57.83% | 57.44% | 82.32% |
| 2021 Feb. 8 | 25 | 9115 | 43.41% | 64.26% | 33.15% | 61.17% | 64.44% | 83.66% |
| 2021 Feb. 1 | 24 | 9400 | 38.73% | 57.68% | 34.50% | 58.87% | 65.40% | 85.84% |
| 2021 Jan. 25 | 23 | 9117 | 40.16% | 61.67% | 38.32% | 61.40% | 59.79% | 84.07% |
| 2021 Jan. 18 | 22 | 8893 | 43.55% | 65.94% | 38.32% | 66.82% | 60.51% | 85.57% |
| 2021 Jan. 11 | 19 | 8553 | 39.14% | 63.72% | 37.54% | 65.31% | 65.72% | 83.78% |
| 2021 Jan. 4 | 17 | 7321 | 33.41% | 61.60% | 32.86% | 63.73% | 58.11% | 80.51% | concentration level in the determined adherence evaluation window for a particular granularity-level-instance based on the determined lookback pattern mapping value. In an exemplary embodiment, On the basis of Table.3 and Table.4, from the pattern1 through patternN the pattern with maximum revenue concentration in the window for a particular granularity-level-instance is selected as the highest-adherent Table. 6 depicts the accuracies calculated on the basis of 2 metrics: +/−3D: Percentage of invoices (by count) predicted within 3 days of the actual clearing date; +/−8D: Percentage of invoices (by count) predicted within 8 days of the actual clearing date.

The columns ADTP (6 wk LB) and ADTP (12 wk LB) in Table. 6 depicts the accuracy when we use the average delay approach to predict payment date on different lookbacks. The column Day Level Inv % in Table. 6 depicts accuracy on using the algorithm used in the present invention.

Based on this comparison, it is observed that the accuracy of the customer pattern adherence process of the present invention is significantly higher than the traditional methods, and the volatility of accuracy is also relatively low over a period of 12 run dates The customer pattern adherence process of the present invention provides a set of advantages over conventional algorithms. The customer pattern adherence process is construed to possess a high explain ability of predictions. Since the customer pattern adherence process keeps track of the set of granularity-level-instances consistency scores across different pattern features, it is therefore easier to provide transparency and explanation around the predictions.

The customer pattern adherence process utilized in the present invention is also construed to possess significantly lower train and prediction time. The present invention is benchmarked to perform 1 train and prediction cycle in ~3 minutes for datasets with >5 m records.

The customer pattern adherence process utilized in the present invention is further construed to possess the ability of fast detection of change in payment patterns. The customer pattern adherence process possesses a compute time significantly lower than the conventional approaches, therefore it is feasible to retrain the financial-transaction-pattern-prediction-based ML model on a higher frequency to capture change in payment patterns. Additionally, the algorithm considers the periodicity and time of different patterns into consideration while determining the lookback for each pattern, which further speeds up the pattern change detection.

The data prediction module 220 is configured to predict a financial transaction payment pattern for the set of open invoices based on the optimal pattern, the set of payment pattern features and the set of granularity level instances by using a financial-transaction-pattern-prediction-based ML model the financial transaction payment pattern comprises an estimated date at which the one or more customers and the one or more vendors complete a financial transaction in order to clear the set of open invoices. The data prediction module 220, executes the following steps to predict a financial transaction payment pattern. In the first step, the data prediction module 220 is configured to apply the determined optimal pattern, the set of payment pattern features and the set of granularity level instances onto the financial-transaction-pattern-prediction-based ML model. In the second step, the data prediction module 220 is configured to map each of the determined optimal patterns, the set of payment pattern features and the set of granularity level instances with the set of open invoices. In the third step, the data prediction module 220 is configured to predict the financial transaction payment pattern for the set of open invoices based on the mapping.

The data output module 222 is configured to output the financial transaction payment pattern on the user interface screen of the one or more electronic devices 110 associated with a user. In an exemplary embodiment of the present disclosure, the one or more users may include one or more customers, one or more vendors, individuals belonging to firms involving payment transactions, individuals belonging business firms, merchants and the like. In an exemplary embodiment of the present disclosure, the one or more electronic devices 110 may include a laptop computer, desktop computer, tablet computer, smartphone, wearable device, smart watch, invoice generation devices and the like.

Figure 3:
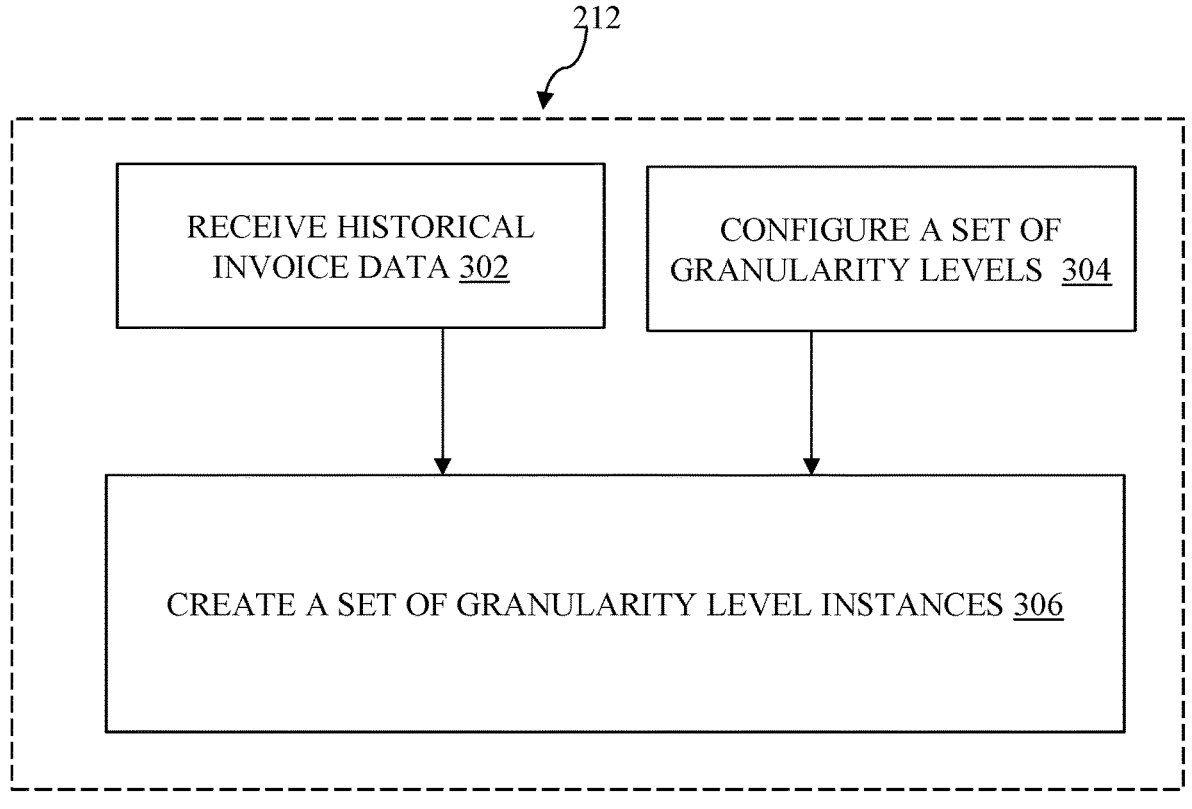
FIG. 3 is a flowchart illustrating an exemplary process of creating granularity level instances by granularity level instance creation module, in accordance with an embodiment of the present disclosure.

FIG. 3 is a flowchart illustrating an exemplary process of creating granularity level instances by granularity level instance creation module 212, in accordance with an embodiment of the present disclosure. At step 302, the invoice data of at least one of one or more customers and one or more vendors is received. The invoice data comprises a set of closed invoices and a set of open invoices along with the set of data attributes. The invoice data further may include at least one of the customer number, payment terms, invoice date, baseline date, due date, discount due date, clearing date, posting date, invoice type, business unit within a company, invoice amount, discount amount percentage, payment block status or a combination thereof. The set of open invoices corresponds to the invoices associated with payment transactions which are yet to occur. The set of closed invoices correspond to the invoices associated with payment transactions previously occurred.

In FIG. 3, At step 304, a set of granularity levels are extracted. The extracted granularity levels received from the invoice data are based on data density, volume, and the set of data attributes. The set of granularity levels comprise at least one of company code, customer number, payment terms and the like.

At step 306, the set of granularity level instances are generated. The generation of the granularity level instances is based on the extracted set of granularity levels. Granularity Level Instances are identifiers of all the entities that belong to the configured granularity level. For Example: Company Code: 1|CustomerNo: 123, Company Code: 1|CustomerNo: 234, and the like, in case the configured set of granularity level is: Company Code+CustomerNumber. Each of the set of granularity level instances correspond to a basic logical unit for which payment transaction pattern is to be determined. In an exemplary embodiment of the present disclosure, if the set of granularity level configuration is set as ['CompanyCode', 'CustomerNo, InvoicePaymentTerm'], granularity level instances values could be: ["Company Code-2300|CustomerNo-1200|PaymentTerm-NET30", "Company Code-2300|CustomerNo-1200|PaymentTerm-NET60" . . . , "Company Code-X|CustomerNo-Y|PaymentTerm-Z"].

Figure 4:
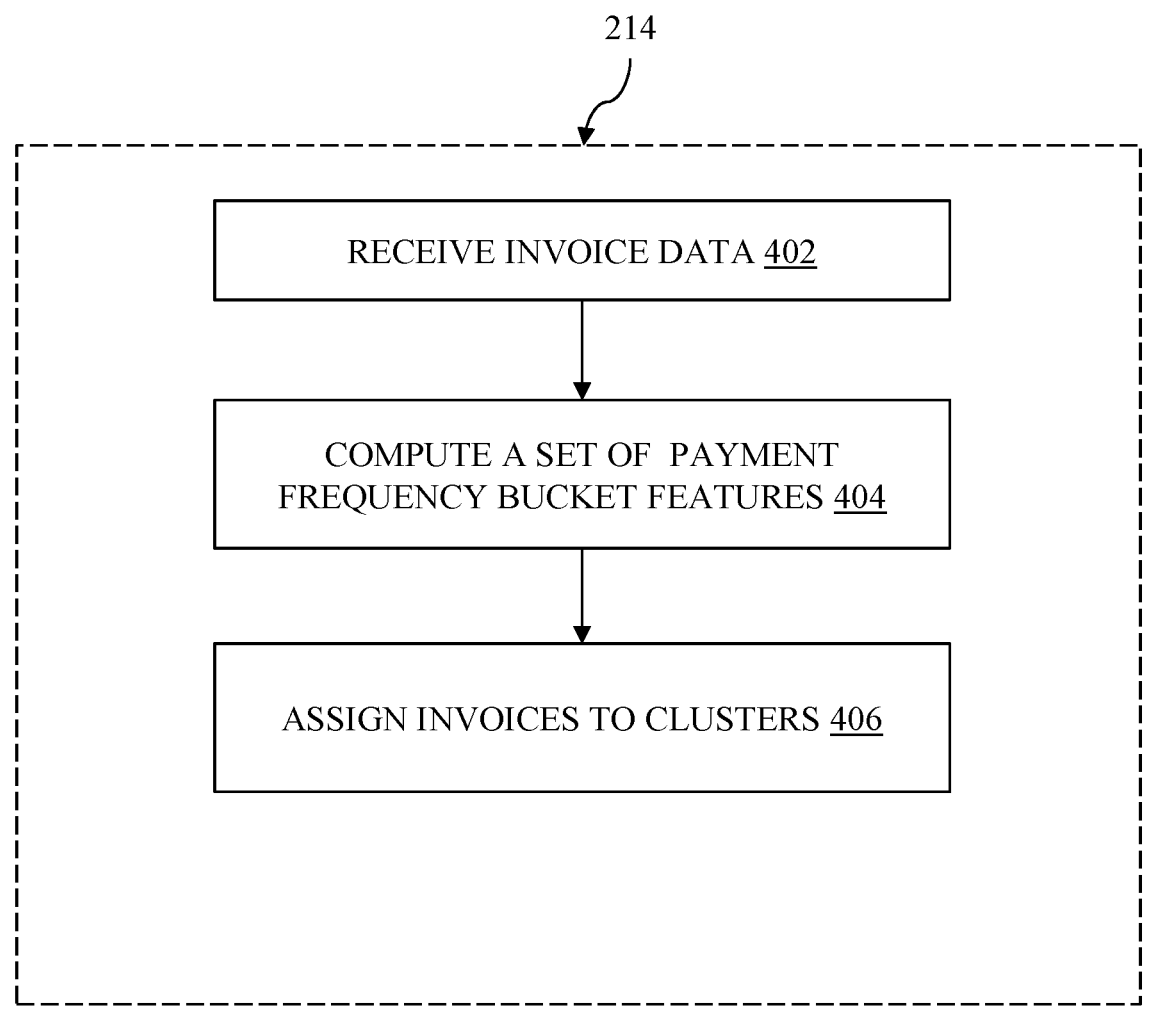
FIG. 4 is a flowchart illustrating an exemplary process of computing payment frequency by a payment frequency computation module, in accordance with an embodiment of the present disclosure.

FIG. 4 is a flowchart illustrating an exemplary process of computing payment frequency by a payment frequency computation module 214, in accordance with an embodiment of the present disclosure. The payment frequency computation module 214 is configured to compute a payment frequency bucket feature for each of the set of granularity level instances. The granularity level instances comprise features such as customer name, company code, customer number payment terms, business unit level, invoice types, and the like. Further, each of the set of granularity level instances belongs to at least one of the following payment frequency buckets or categories: a weekly payer, an alternative week payer, once-a-month payer, a quarterly payer, a half-yearly payer, a yearly payer, and the like. Further, the payment frequency computation module 214 assigns the set of closed invoices to a set of clusters based on the determined payment frequency bucket features and the data density.

At step 402, the invoice data is received. At step 404, the payment frequency bucket feature is computed for each of the set of granularity level instances. Further, each of the set of granularity level instance belongs to at least one of the following buckets or categories: a weekly payer, alternative weekly payer, a monthly payer, a bi-monthly, a quarterly payer, a half yearly payer and an annual payer. At step 406, the set of closed invoices are assigned to a set of clusters based on the determined payment frequency bucket features and the data density. Each of the set of clusters comprises of invoices with similar payment frequency bucket feature and data density corresponding to each of the set of granularity-level-instances. At step 406, assigning the set of closed invoices to the set of clusters is based on the determined payment frequency bucket features and the data density. The assigning of the set of closed invoices to the set of clusters includes the following steps. In the first step, the relationship between count of payment weeks and due weeks on the invoice data are evaluated with respect to multiple sets of lookback periods. In the second step, the granularity level instances are classified to the determined payment frequency bucket features based on the evaluated relationship. In the third step the set of closed invoices are assigned to the set of clusters based on the determined payment frequency bucket features and the data density.

Figure 5:
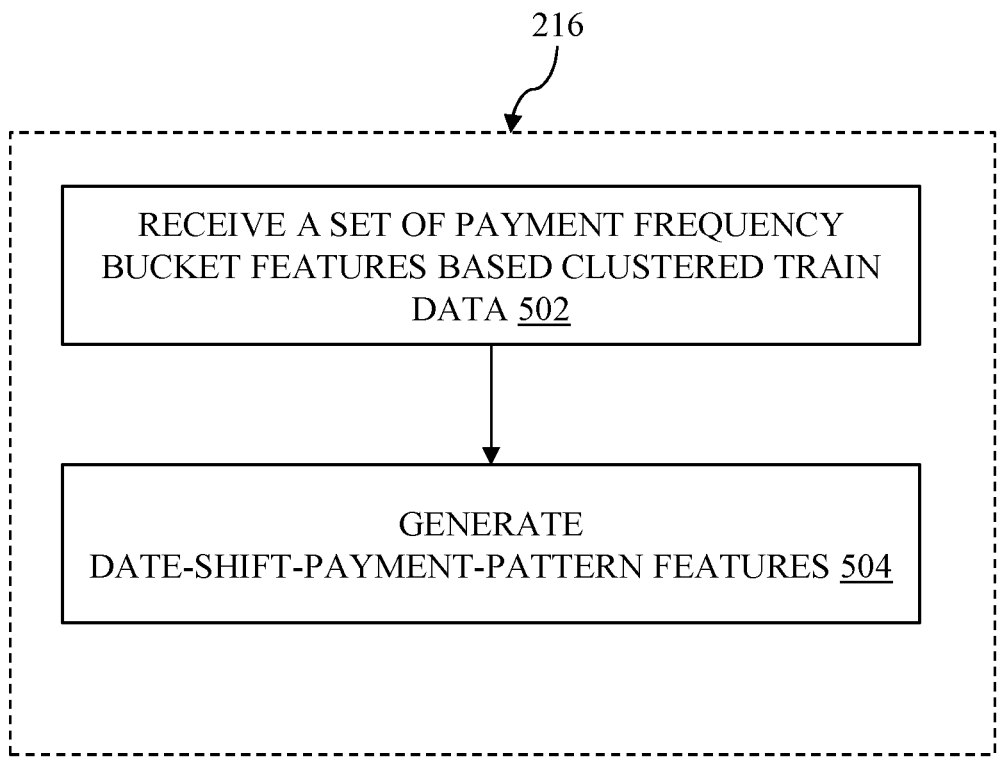
FIG. 5 is flowchart illustrating an exemplary process of generating a set of date-shift-payment pattern features by payment pattern generation module, in accordance with an embodiment of the present disclosure.

FIG. 5 is a flowchart illustrating an exemplary process of generating a set of date-shift-payment pattern features by payment pattern generation module 216, in accordance with an embodiment of the present disclosure. The payment pattern generation module 216 is configured to dynamically generate a set of date-shift-payment pattern features based on the determined set of payment frequency bucket features assigned to the set of clusters. At step 502, the payment frequency bucket based clustered data is received. At step 504, the set of date-shift-payment-pattern features are generated. The set of date-shift-payment-pattern features are generated by shifting a set of invoice level date attributes comprising at least one of: discount date, due date, clearing date and invoice date to a set of reference points on a calendar, based on the determined payment frequency bucket features of the set of clusters. Each of the set of date-shift-payment-pattern features indicates a date on which payment transaction is set to occur for each of the set of open invoices. In an exemplary embodiment of the present disclosure, the set of date-shift-payment pattern features comprise of the probable payment pattern such as—payment may happen at the end of the month, for the invoices generated before 10th day of the month; payment may happen at the mid of next month, for the invoices generated after 10th day of the current month; payment may happen at the end of the quarter: payment may happen within 15 days of invoice creation date and the like.

FIG. 6 is a flowchart illustrating an exemplary process of selecting an optimal pattern by a payment pattern selection module 218, in accordance with an embodiment of the present disclosure. The payment pattern selection module 218 is configured to determine an optimal pattern from among the generated set of date-shift-payment pattern features with the highest probability of adherence for each granularity level instance using a customer pattern adherence process. The payment pattern selection module 218 comprises of the following steps. At step 602, the invoice data comprising the payment frequency bucket feature based clustered training data is received. At step 604, the set of date-shift-payment-pattern features are obtained. Further, at step 606, the cumulative error distribution value of historical errors is received, for each of the set of date-shift-payment patterns corresponding to each of the set of granularity level instances. In order to estimate the cumulative error distribution value of the historical errors for each of the set of date-shift-payment-pattern features corresponding to each of the set of granularity level instances comprises of the following steps. In the first step, an adherence evaluation window for a particular customer is determined. The adherence evaluation window comprises a lower bound value and an upper bound value. The lower bound corresponds to a lowest limit or lowest threshold value, and the upper bound value corresponds to a maximum limit or a maximum threshold value. In the second step, the payment pattern selection module 218, determines the lookback period for each of the set of date-shift-pattern-feature based on the time period of each of the set of date-shift-pattern-feature. For example, for a month-end, date shift payment pattern features where all the invoices due in a month get paid at the last day of the month in one-go, the set of date-shift-pattern-feature consists of the lookback period which is a multiple of its time period, (i.e., 30 days). At the end of the second step, each of the set of date-shift-pattern-features will consist of the lookback period mapped, for which the cumulative error distribution value estimation will be determined. In the third step, for each of the set date-shift-pattern-feature, invoices cleared within the lookback period of each of the set of the corresponding date-shift-payment feature are filtered. For the filtered invoices, a cumulative error distribution value of historical errors by revenue is computed for that date shift payment pattern features against the actual clearing date of the Invoices. In the third step, for each of the set of date-shift-payment-pattern-features, the cumulative error distribution of historical errors value by revenue percentage received within the adherence evaluation window is computed. The cumulative error distribution value of historical errors corresponds to the revenue concentration levels in the determined adherence evaluation window.

Additionally, in order to estimate the cumulative error distribution value of historical errors based on the determined lookback pattern mapping value, comprises of the following steps. At the first step, the set of closed invoices based on the lookback period of the lookback pattern mapping value are filtered. The set of closed invoices cleared within the lookback period are filtered. At the second step, a gap between the clearing date and the pattern date for each of the patterns in the determined lookback pattern mapping value is calculated. At the third step, a sum amount and a cumulative sum amount for each calculated gap and the granularity level instance is calculated. At the fourth step, the cumulative error distribution value of historical errors is estimated by calculating the revenue percentage at each stage respective to revenue of the granularity level instance in the lookback period. At the fifth step, the revenue concentration levels are calculated in the determined adherence evaluation window for each of the customers in the estimated cumulative error distribution value of historical errors.

Further, at step 608, the probability value of adherence for each of the set of date-shift-payment-pattern features are estimated by the payment pattern selection module 218. The probability value of adherence is estimated by comparing each of the set of date-shift-payment-pattern features with an actual clearing date based on the estimated cumulative error distribution value of historical errors.

Furthermore, at step 610, the optimal pattern from the set of date-shift-payment pattern is determined. The optimal pattern corresponds to a pattern with highest probability of adherence for each of the set of granularity level instances. In order to determine the optimal pattern from the set of date-shift-payment patterns, the optimal pattern with maximum revenue concentration level in the determined adherence evaluation window for a particular granularity-level-instance is selected based on the determined lookback pattern mapping value.

Figure 7:
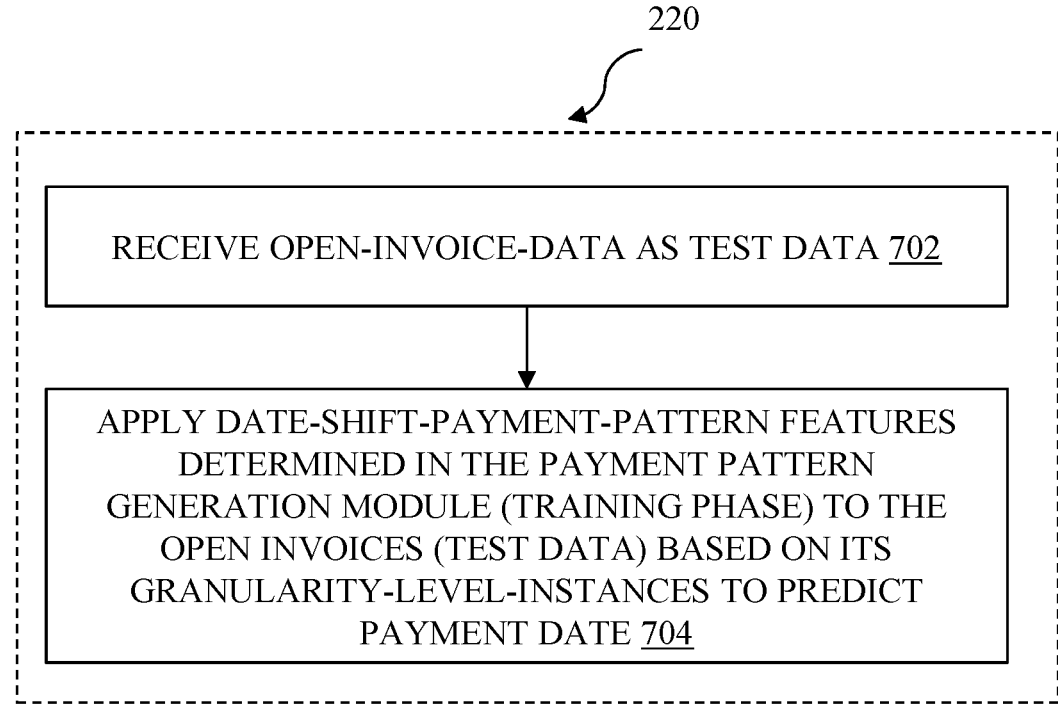
FIG. 7 is a flowchart illustrating an exemplary process of predicting a financial transaction payment pattern by a date prediction module, in accordance with an embodiment of the present disclosure.

FIG. 7 is a flowchart illustrating an exemplary process of predicting a financial transaction payment pattern by a data prediction module 220 in accordance with an embodiment of the present disclosure. The data prediction module 220, configured to predict a financial transaction payment pattern for the set of open invoices based on the optimal pattern, the set of payment pattern features and the set of granularity level instances by using a financial-transaction-pattern-prediction-based ML model. The financial transaction payment pattern comprises an estimated date at which the one or more customers and the one or more vendors complete a financial transaction in order to clear the set of open invoices. The data prediction module 220, comprises applying the determined optimal pattern, the set of payment pattern features and the set of granularity level instances onto the financial-transaction-pattern-prediction-based ML model. The data prediction module 220 further comprises mapping each of the determined optimal patterns, the set of payment pattern features and the set of granularity level instances with the set of open invoices. Furthermore, the data prediction module 220 comprises predicting the financial transaction payment pattern for the set of open invoices based on the mapping.

In another embodiment of the present disclosure the input to the ML-based computing system 102 is segregated into three phases—the data input phase, the training phase and the testing or prediction phase. The data input phase comprises of the data receiver module 210. The training Phase comprises of the granularity level instance creation module 212, payment frequency computation module 214, payment pattern generation module 216 and payment pattern selection module 218. Further, the testing or prediction phase comprises of the data prediction module 220 and data output module 222.

Figure 8:
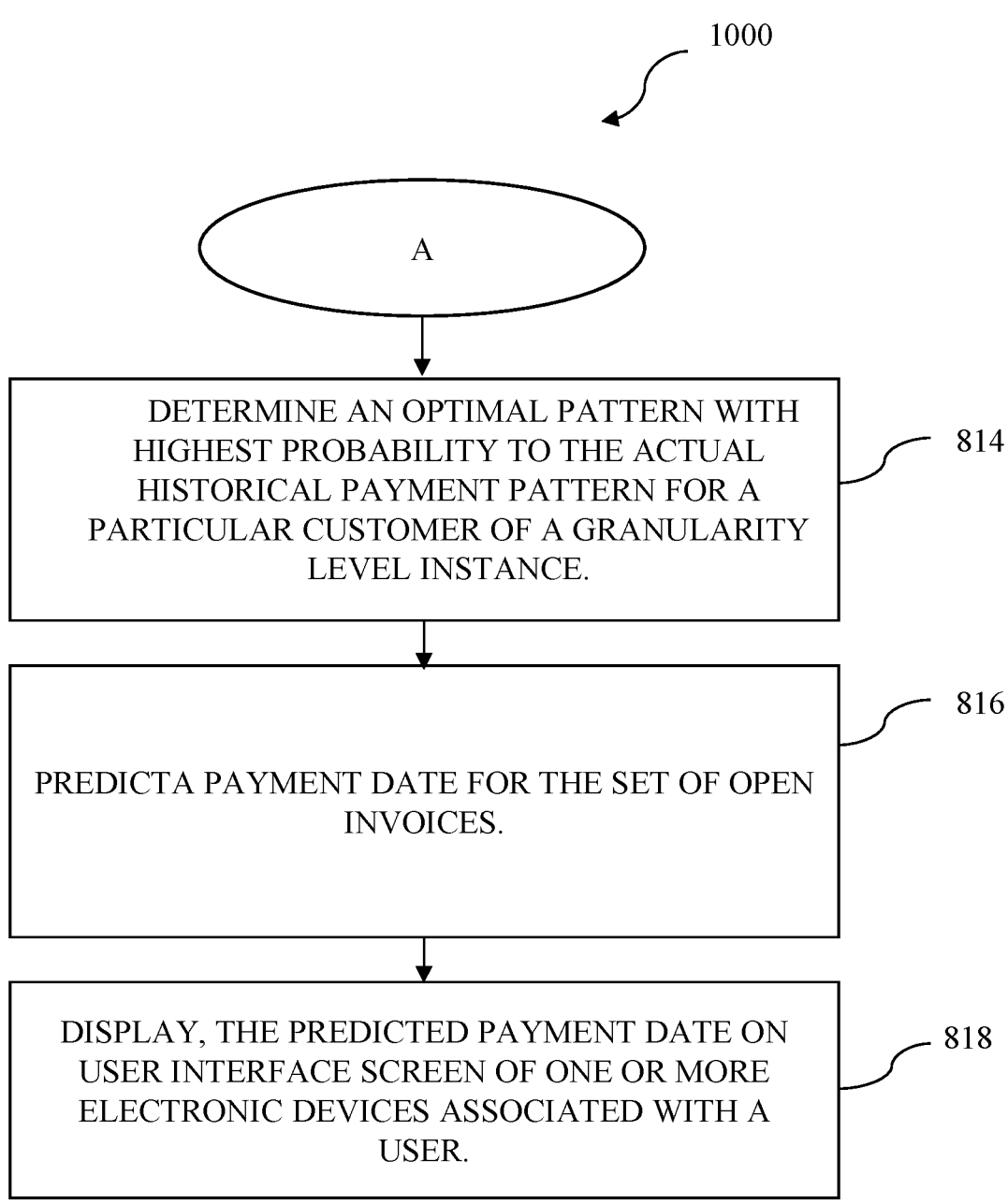
FIG. 8 is a process flow diagram illustrating an exemplary, Machine Learning (ML)-based process for predicting financial transaction patterns, in accordance with an embodiment of the present disclosure.

FIG. 8 is a process flow diagram illustrating an exemplary, Machine Learning (ML)-based process for facilitating predicting financial transaction patterns, in accordance with an embodiment of the present disclosure. At step 802, the ML-based computing system 102, is configured to receive invoice data of at least one of one or more customers and one or more vendors from the external database 108. The invoice data comprises a set of closed invoices and a set of open invoices along with a set of data attributes. The invoice data comprises a set of closed invoices and a set of open invoices. The invoice data comprises customer number, payment terms, invoice date, baseline date, due date, discount due date, clearing date, posting date, invoice type, business unit within a company, invoice amount, discount amount percentage and payment block status. The set of open invoices corresponds to the invoices associated with payment transactions which are yet to occur. The set of closed invoices corresponds to the invoices associated with payment transactions previously occurred.

At step 804, the ML-based computing system 102, extracts a set of granularity levels from the received invoice data based on data density, volume, and the set of data attributes. The set of granularity levels comprise at least one of company code, customer number payment terms and the like.

At step 806, the ML-based computing system 102 generates a set of granularity level instances based on the extracted set of granularity levels. Each of the set of granularity level instances are identifiers of all the entities that belong to the configured granularity level. For Example: Company Code: 1|CustomerNo: 123, CompanyCode: 1|CustomerNo: 234, and the like, if the configured granularity level is: CompanyCode+CustomerNumber. Each of the set of granularity level instances correspond to a basic logical unit for which payment transaction pattern is to be determined. Example: If granularity level is set as ['company code', 'customer number', payment term']: the set of granularity level instances generated will be ['1200'|'1000'|'NET30'], [1200'|'1000'|'NET60'], ['5600'|'2000'|'NETPROX'], ['1234'|'3000'|'NETDISC']. Each granularity level instance within the set of granularity level instances is a basic logical unit for which Payment Pattern Detection is processed.

At step 808, the ML based computing system 102, is configured to compute a payment frequency bucket feature for each of the set of granularity level instances. Further, each of the set of granularity level instances belongs to at least one of the following buckets or categories: a weekly payer, alternative weekly payer, a monthly payer, a bi-monthly, a quarterly payer, a half yearly payer and an annual payer. The payment frequency bucket features correspond to one of: a customer and a vendor to be at least one of: a weekly payer, alternative weekly payer, a monthly payer, a bi-monthly, a quarterly payer, a half yearly payer and an annual payer.

At step 810, the ML based computing system 102, assigns the set of closed invoices to a set of clusters based on the determined payment frequency bucket features and the data density. Each of the set of clusters will comprise of Invoices with the similar payment frequency bucket features and data density corresponding to the respective set of the granularity-level-instance. In order to assign the set of closed invoices to the set of clusters based on the determined payment frequency bucket features and the data density, the payment frequency computation module 214 executes the following steps. In the first step, the payment frequency computation module 214 is configured to evaluate the relationship between count of payment weeks and due weeks on the historical invoice data with respect to multiple sets of lookback periods. In the second step, the payment frequency computation module 214 is configured to classify the granularity level instances into the determined payment frequency bucket features based on the evaluated relationship. In the third step, the payment frequency computation module 214 is configured to assign the set of closed invoices to the set of clusters based on the determined payment frequency bucket features and the data density. Additionally, at step 810, the payment frequency computation module 214 assigns the one or more customers or one or more vendors to be at least one of: weekly payer, alternative week payer, once-a-month payer, quarterly payer, and the like.

At step 812, the ML-based computing system 102, dynamically generates the set of date-shift-payment pattern features based on the determined set of payment frequency bucket features assigned to the set of clusters. At step 812, the payment pattern generation module 216 dynamically generates the set of date-shift-payment-pattern features by shifting a set of invoice level date attributes comprising at least one of: discount date, due date, clearing date and invoice date to a set of reference points on the calendar, based on the determined payment frequency bucket features of the set of clusters. Each of the set of date-shift-payment-pattern features indicates a date on which payment transaction is set to occur for each of the set of open invoices. In an exemplary embodiment of the present disclosure, the set of date-shift-payment pattern features include the payment patterns such as: payment may happen at the end of the month, for the invoices generated before 10th day of the month, payment may happen at the mid of next month, for the invoices generated after 10th day of the current month, payment may happen at the end of the quarter, payment may happen within 15 days of invoice creation date or a combination thereof.

At step 814, the ML based computing system 102, determines an optimal pattern from among the generated set of date-shift-payment pattern features with the highest probability of adherence for each granularity level instance using a customer pattern adherence process. At step 814, in order to determine an optimal pattern from among the generated set of date-shift-payment pattern features with the highest probability of adherence for each granularity level instance using a customer pattern adherence process, the following steps are executed. In the first step, the historical invoice data comprising the payment frequency bucket feature based clustered training data and the set of date-shift-payment-pattern features are obtained by the payment pattern selection module 218. In the second step, the cumulative error distribution value of historical errors is estimated for each of the set of date-shift-payment-pattern features corresponding to each of the set of granularity level instances. In order to estimate the cumulative error distribution value of historical errors the payment pattern selection module 218 is configured to execute the following steps. In the first step the payment pattern selection module 218 determines an adherence evaluation window for a particular customer. The adherence evaluation window comprises a lower bound value and an upper bound value. For example, adherence_eval_window←[lower_bound, upper_bound]. In the second step, the payment pattern selection module 218, determines a lookback period for each of the set of date-shift-pattern-features based on the time period of each of the set of date-shift-pattern-features. For example, for a month-end, date shift payment pattern features where all the invoices due in a month get paid at the last day of the month in one-go, the set of date-shift-pattern-feature consists of a lookback which is a multiple of its time period. (i.e., 30 days). At the end of the second step, each of the set of date-shift-payment-pattern-feature will consist of a lookback period mapped, for which the cumulative error distribution value of historical errors will be determined. In the third step, for each of the set date-shift-pattern-feature, invoices cleared within the lookback period of each of the set of the corresponding date-shift-payment feature are filtered. For the filtered invoices, a cumulative error distribution value of historical errors by revenue is computed for that date shift payment pattern features against the actual clearing date of the Invoices. In the third step, for each of the set of date-shift-payment-pattern-features, the cumulative error distribution value of historical errors by revenue percentage received within the adherence evaluation window is computed. In FIG. 8, an oval shape with 'A' is an off-page reference which indicates that the flow diagram continues onto a new page.

The cumulative error distribution value of historical errors corresponds to the revenue concentration levels in the determined adherence evaluation window. Furthermore, In the fourth step, the payment pattern selection module 218 estimates the cumulative error distribution value of the historical errors based on the determined lookback pattern mapping value, by the following steps. In the first step the payment pattern selection module 218 filters the set of closed invoices based on the lookback period of the lookback pattern mapping value. The set of closed invoices cleared within the lookback period are filtered. In the second step the payment pattern selection module 218 calculates a gap between clearing date and a pattern date for each of the patterns in the determined lookback pattern mapping value. In the third step, the payment pattern selection module 218 calculates a sum amount and a cumulative sum amount for each calculated gap and the granularity level instance. In the fourth step, the payment pattern selection module 218 estimates the cumulative error distribution value by calculating the revenue percentage at each stage respective to historical revenue of the granularity level instance in the lookback period. In the fifth step, the payment pattern selection module 218 calculates the revenue concentration levels in the determined adherence evaluation window for each of the customers in the estimated cumulative error distribution value of historical errors. The result of the previous step provides granularity-level-instance revenue consistency for each pattern.

At step 814, the payment pattern selection module 218 is configured to estimate a probability value of adherence for each of the set of date-shift-payment-pattern features by comparing each of the set of date-shift-payment-pattern features with an actual clearing date based on the estimated cumulative error distribution value of historical errors. Furthermore, at step 814, the payment pattern selection module 218 is configured to determine the optimal pattern from the set of date-shift-payment patterns. The optimal pattern corresponds to a pattern with highest probability of adherence for each of the set of granularity level instances. To determine the optimal pattern from the set of date-shift-payment patterns, the payment pattern selection module 218 is configured to select the optimal pattern with maximum revenue concentration level in the determined adherence evaluation window for a particular granularity-level-instance based on the determined lookback pattern mapping value.

Furthermore, the payment pattern selection module 218 is configured to determine the optimal pattern from the set of date-shift-payment patterns. The optimal pattern corresponds to a pattern with highest probability of adherence for each of the set of granularity level instances. At step 816, The ML based computing system 102, predicts a financial transaction payment pattern for the set of open invoices based on the optimal pattern, the set of payment pattern features and the set of granularity level instances by using a financial-transaction-pattern-prediction-based ML model. The financial transaction payment pattern comprises an estimated date at which the one or more customers and the one or more vendors complete a financial transaction to clear the set of open invoices. At step 816, predicting the financial transaction payment pattern for the set of open invoices based on the optimal pattern, the set of payment pattern features and the set of granularity level instances by using the financial-transaction-pattern-prediction-based ML model comprises of the following steps. In the first step the data prediction module 220 is configured to apply the determined optimal pattern, the set of payment pattern features and the set of granularity level instances onto the financial-transaction-pattern-prediction-based ML model. In the second step, the data prediction module 220 is configured to map each of the determined optimal patterns, the set of payment pattern features and the set of granularity level instances with the set of open invoices. In the third step, the data prediction module 220 is configured to predict the financial transaction payment pattern for the set of open invoices based on the mapping.

In an alternative embodiment, the financial-transaction-pattern-prediction-based ML-model used for predicting the financial transaction payment pattern in the data prediction module 220) uses a regression-based ML-model.

In another embodiment, the regression-based ML-model may include one or more of simple linear regression models, multiple linear regression models, polynomial regression models, support vector regression models, decision tree regression models, random forest regression models, and the like.

In another embodiment, the regression-based ML-model may include light gradient boost machine (light GBM), extreme gradient boost (XGBoost), categorical boosting (CatBoost) and the like.

In another embodiment, the light GBM model is used for predicting the financial transaction payment pattern. The light GBM is a gradient-boosting framework that uses tree-based learning algorithms for regression tasks. The light GBM is designed to be efficient and scalable, particularly for datasets with a large number of features. In a regression analysis, the light GBM model predicts a continuous target variable based on a set of input features. The light GBM model uses a set of decision trees to make predictions, wherein each tree is built to correct the errors of the previous trees. The final prediction is obtained by determining a weighted average of the predictions from all the decision trees within the set of decision trees.

In yet another embodiment, the data prediction module 220 uses a Light GBM model to predict financial transaction payment patterns. The financial transaction payment pattern comprises an estimated date at which the one or more customers and the one or more vendors complete a financial transaction to clear the set of open invoices.

The input for the data prediction module 210 includes one or more optimal patterns as generated by the payment pattern selection module 218, the set of payment pattern features as generated by the payment frequency computation module 214, and the set of granularity level instances as generated by the granularity level instance creation module 212.

In another embodiment, the data is pre-processed to ensure a suitable format for input into the light GBM regression model.

In another embodiment, the light GBM model is trained using the pre-processed input data to predict the financial transaction payment pattern. The light GBM model uses a set of decision trees to make these predictions, where each tree is built to correct the errors of the previous trees. The final prediction is obtained by determining a weighted average of the predictions from all the decision trees.

The financial transaction payment pattern predicted by the light GBM model is transmitted to the data output module 222. The data output module 222 is configured to output the financial transaction payment pattern on the user interface screen of one or more electronic devices 110 associated with a user.

In another embodiment, the XGBoost model is used for predicting the financial transaction payment pattern. The XGBoost model is an open-source library, providing an efficient and effective implementation of a gradient boosting algorithm for regression problems. The gradient boosting algorithm includes a technique that builds an ensemble of decision trees. Each of the decision tree corrects the errors committed by the previous decision trees. The the XGBoost model uses objective functions containing a loss function and a regularization term to prevent overfitting. Additionally, the XGBoost model utilizes various optimization techniques such as parallelization, tree pruning, and handling of missing values. The XGBoost model can be used for regression problems by specifying the appropriate objective function for mean squared error and root mean squared error.

In one embodiment, the data prediction module 220 uses the XGBoost model to predict financial transaction payment patterns. The financial transaction payment pattern comprises an estimated date at which the one or more customers and the one or more vendors complete a financial transaction to clear the set of open invoices.

The input for the data prediction module includes one or more of optimal pattern as generated by the payment pattern selection module 218, the set of payment pattern features as generated by the payment frequency computation module 214 and the set of granularity level instances as generated by the granularity level instance creation module 212.

In another embodiment, the data is pre-processed to ensure that it is in a suitable format for input into the XGBoost model.

In another embodiment, the XGBoost model is trained using the pre-processed input data to predict the financial transaction payment pattern. The XGBoost model uses a set of decision trees to make predictions. Each of the decision trees within the set of decision trees is built to correct the errors of the previous decision trees. The final prediction is obtained by determining a weighted average of the predictions from all the decision trees. The XGBoost model uses objective functions comprising a loss function and a regularization term to prevent overfitting.

The financial transaction payment patterns predicted by the XGBoost model are transmitted to the data output module 222. The data output module 222 is configured to output the financial transaction payment pattern on a user interface screen of one or more electronic devices 110 associated with a user.

In one embodiment, the CatBoost model is used for predicting the financial transaction payment pattern. The CatBoost model is an open-source library that provides an efficient and effective implementation of the gradient-boosting algorithm for regression problems. The term "CatBoost" stands for Categorical Boosting. One of the main features of the CatBoost model is the ability to handle categorical data without requiring extensive preprocessing. The CatBoost model uses a novel algorithm called "ordered target statistics algorithm". The ordered target statistics algorithm encodes categorical features, thereby reducing overfitting and improving prediction accuracy. The CatBoost model builds an ensemble of decision trees, where each decision tree corrects the errors committed by the previous decision trees. The CatBoost model uses a specific objective function containing a loss function and a regularization term to prevent overfitting. Additionally, the CatBoost model uses various optimization techniques, such as parallelization, tree pruning, and handling of missing values.

The CatBoost model can be used for regression problems by specifying the appropriate objective function (such as RMSE for root mean squared error) and evaluation metric (such as R2 for coefficient of determination). Additionally, the CatBoost model supports various hyperparameters that can be tuned to improve the model performance, such as iterations, depth, learning rate, and the like.

In one embodiment, the data prediction module 220 uses a CatBoost model to predict financial transaction payment patterns. The financial transaction payment pattern comprises an estimated date at which the one or more customers and the one or more vendors complete a financial transaction to clear the set of open invoices.

The input for the data prediction module includes one or more of optimal pattern as generated by the payment pattern selection module 218, the set of payment pattern features as generated by the payment frequency computation module 214 and the set of granularity level instances as generated by the granularity level instance creation module 212.

In another embodiment, the data is pre-processed to ensure a suitable format for input into the CatBoost model.

In another embodiment, the CatBoost model is trained using the pre-processed input data to predict the financial transaction payment pattern. The CatBoost model uses a set of decision trees to make predictions. Each decision tree is built to correct the errors of the previous decision trees. The final prediction is obtained by determining the weighted average of the predictions from all the decision trees. The CatBoost model uses objective functions comprising of a loss function and a regularization term to prevent overfitting.

The financial transaction payment pattern predicted by the CatBoost regression model is transmitted to the data output module 222. The data output module 222 is configured to output the financial transaction payment pattern on the user interface screen of one or more electronic devices 110 associated with a user.

In certain embodiments, the present invention provides a method for dynamically updating and re-training the ML-based computing system 102. The method comprises: monitoring the performance of the financial-transaction-pattern-prediction-based ML model in real time: identifying instances where the performance of the ML-based computing system 102 decreases below a predetermined threshold: automatically generating new training data based on the identified instances; and retraining the financial-transaction-pattern-prediction-based ML model using the new training data.

On retraining the ML-based computing system 102, the ML-based computing system 102 becomes more proficient at predicting financial payment transaction patterns. Retaining the ML-based computing system 102 results in significant benefits for the processing hardware (such as, servers) and the overall decision-making process. The continuous improvement in accuracy and efficiency, facilitated by retraining the financial-transaction-pattern-prediction-based ML model, leads to tangible gains in performance. Retraining optimizes the use of processing hardware and reduces the number of incorrect predictions. By streamlining the ML-based computing system 102, the invention provides a more robust and reliable solution for predicting the financial transaction payment patterns.

At step 818, the ML based computing system 102, displays financial transaction payment patterns on the user interface screen of one or more electronic devices 110 associated with the one or more users. A data output module 222, configured to output the financial transaction payment pattern on the user interface screen of one or more electronic devices 110 associated with a user. In an exemplary embodiment of the present disclosure, the one or more users may include one or more customers, one or more vendors, individuals belonging to firms involving payment transactions, individuals belonging to business firms, merchants and the like. In an exemplary embodiment of the present disclosure, the one or more electronic devices 110 may include a laptop computer, desktop computer, tablet computer, smartphone, wearable device, smart watch, invoice generation devices and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 206 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising." "having," "containing," and "including." and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A machine learning (ML)-based computing system for predicting financial payment transaction patterns in a computing environment, the ML-based computing system comprising:

one or more hardware processors; and a memory coupled to the one or more hardware processors, wherein the memory comprises a plurality of modules in the form of programmable instructions executable by the one or more hardware processors, and wherein the plurality of modules comprises:

a data receiver module configured to receive invoice data of at least one of one or more customers and one or more vendors from an external database, wherein the invoice data comprises a set of closed invoices and a set of open invoices along with a set of data attributes;

a granularity level instance creation module configured to:

extract a set of granularity levels from the received invoice data based on data density, volume, and the set of data attributes, wherein the set of granularity levels comprises at least one of company code, customer number, business unit level, invoice types, and payment terms; and generate a set of granularity level instances based on the extracted set of granularity levels, wherein each of the set of granularity level instances corresponds to a basic logical unit for which payment transaction pattern is to be determined, wherein the payment transaction pattern is associated to a payment date;

a payment frequency computation module configured to:

compute a payment frequency bucket feature for each of the set of granularity level instances, wherein the payment frequency bucket features corresponds to one of: a weekly payer, alternative weekly payer, a monthly payer, a bi-monthly, a quarterly payer, a half yearly payer and an annual payer; and assign the set of closed invoices to a set of clusters based on the determined payment frequency bucket features and the data density, wherein each of the set of clusters comprises closed invoices based on the set of payment frequency bucket features and the data density corresponding to each of the set of granularity level instances;

a payment pattern generation module configured to dynamically generate a set of date-shift-payment pattern features by shifting a set of invoice level date attributes comprising at least one of: discount date, due date, clearing date and invoice date to a set of reference points on a calendar, based on the determined set of payment frequency bucket features assigned to the set of clusters, wherein each of the set of date-shift-payment pattern features indicates a date on which payment transaction is set to occur for each of the set of open invoices, a payment pattern selection module configured to determine an optimal pattern from among the generated set of date-shift-payment pattern features with a highest probability of adherence for each granularity level instance using a customer pattern adherence process, wherein the payment pattern selection module is configured to:

determine an adherence evaluation window comprising a lower bound value and an upper bound value;

configure a specific lookback period for each of the set of date-shift-payment pattern features, wherein the specific lookback period is calculated as a multiple of a time period of a cycle of the respective date-shift-payment pattern feature;

filter the set of closed invoices that cleared within the configured specific lookback period;

calculate a gap between an actual clearing date and a pattern date predicted by the date-shift-payment pattern feature for the filtered closed invoices;

compute a revenue concentration level within the determined adherence evaluation window by calculating a cumulative sum of the calculated gaps based on revenue percentage; and select the optimal pattern with a maximum revenue concentration level in the adherence evaluation window for each granularity level instance;

a data prediction module configured to predict a financial transaction payment pattern for the set of open invoices based on the optimal pattern, the set of payment pattern features and the set of granularity level instances by using a financial-transaction-pattern-prediction-based ML model, wherein the financial transaction payment pattern comprises an estimated date at which the one or more customers and the one or more vendors complete a financial transaction to clear the set of open invoices, wherein the financial-transaction-pattern-prediction based ML model is a regression-based ML model, wherein the regression-based ML model is configured to:

pre-process input data comprising the optimal pattern, the set of payment pattern features, and the set of granularity level instances to ensure a format suitable for input into the regression-based ML model;

train a set of decision trees using the pre-processed input data to iteratively correct prediction errors for the financial transaction payment pattern;

apply at least one of: regularization to prevent overfitting, and encoding of categorical features to eliminate need for extensive pre-processing; and output a weighted average of the predictions from all the set of decision trees;

wherein the ML-based computing system is configured to:

dynamically monitor prediction performance of the regression-based ML model in real time;

identify instances where the prediction performance decreases below a predetermined threshold;

automatically generating new training data based on the identified instances; and retrain the regression-based ML model using newly generated training data; and a data output module configured to output the predicted financial transaction payment pattern on an user interface screen of one or more electronic devices associated with a user.

2. The ML-based computing system of claim 1, wherein the invoice data comprises a set of closed invoices and a set of open invoices, wherein the invoice data comprises customer number, payment terms, invoice date, baseline date, due date, discount due date, clearing date, posting date, invoice type, business unit within a company, invoice amount, discount amount percentage and payment block status, and wherein the set of open invoices corresponds to the invoices associated with payment transactions which are yet to occur, and wherein the set of closed invoices corresponds to the invoices associated with payment transactions previously occurred.

3. The ML-based computing system of claim 1, wherein in determining the optimal pattern from among the generated set of date-shift-payment pattern features with the highest probability of adherence for each granularity level instance using the customer pattern adherence process, the payment pattern selection module is configured to:

obtain the historical invoice data comprising the payment frequency bucket feature based clustered training data and the set of date-shift-payment pattern features;

estimate a cumulative error distribution value of historical errors for each of the set of date-shift-payment patterns corresponding to each of the set of granularity level instances;

estimate a probability value of adherence for each of the set of date-shift-payment pattern features by comparing each of the set of date-shift-payment pattern features with an actual clearing date based on the estimated cumulative error distribution value of historical errors; and determine the optimal pattern from the set of date-shift-payment pattern features, wherein the optimal pattern corresponds to a pattern with highest probability of adherence for each of the set of granularity level instances.

4. The ML-based computing system of claim 3, wherein in estimating the cumulative error distribution value of historical errors for each of the set of date-shift-payment pattern features corresponding to each of the set of granularity level instances, the payment pattern selection module is configured to:

determine an adherence evaluation window for a particular customer, wherein the adherence evaluation window comprises a lower bound value and an upper bound value;

determine a lookback period for each of the set of date-shift-payment pattern features, wherein the lookback period is a multiple of a time period of each of the set of date-shift-pattern-features; and determine the cumulative error distribution for each of the set of date-shift-payment pattern features per granularity level instances, wherein the cumulative error distribution value corresponds to the revenue concentration levels in the determined adherence evaluation window.

5. The ML based computing system of claim 4, wherein estimating the cumulative error distribution value of the historical errors based on the determined lookback pattern mapping value, the payment pattern selection module is configured to:

filter the set of closed invoices based on lookback period of the lookback pattern mapping value, wherein the set of closed invoices cleared within the lookback period are filtered;

calculate a gap between clearing date and a pattern date for each of the pattern in the determined lookback pattern mapping value;

calculate a sum amount and a cumulative sum amount for each calculated gap and the granularity level instance;

estimate the cumulative error distribution value of historical errors by calculating the revenue percentage at each stage respective to historical revenue of the granularity level instance in the lookback period; and calculate the revenue concentration levels in the determined adherence evaluation window for each of the customers in the estimated cumulative error distribution value of historical errors.

6. The ML based computing system of claim 3, wherein in determining the optimal pattern from the set of date-shift-payment pattern features, the payment pattern selection module is configured to:

select the optimal pattern with maximum revenue concentration level in the determined adherence evaluation window for a particular granularity level instances based on the determined lookback pattern mapping value.

7. The ML based computing system of claim 1, wherein predicting the financial transaction payment pattern for the set of open invoices based on the optimal pattern, the set of payment pattern features and the set of granularity level instances by using the financial-transaction-pattern-prediction-based ML model, the data prediction module is configured to:

apply the determined optimal pattern, the set of payment pattern features and the set of granularity level instances onto the financial-transaction-pattern-prediction-based ML model;

map each of the determined optimal pattern, the set of payment pattern features and the set of granularity level instances with the set of open invoices; and predict the financial transaction payment pattern for the set of open invoices based on the mapping.

8. A machine learning (ML)-based method for predicting financial transaction patterns in a computing environment, the ML-based method comprising:

receiving, by a processor, invoice data of at least one of one or more customers and one or more vendors from an external database, wherein the invoice data comprises a set of closed invoices and a set of open invoices along with a set of data attributes;

extracting, by the processor, a set of granularity levels from the received invoice data based on data density, volume, and the set of data attributes, wherein the set of granularity levels comprises at least one of company code, customer number, business unit level, invoice types, and payment terms; and generating, by the processor, a set of granularity level instances based on the extracted set of granularity levels, and wherein each of the set of granularity level instances corresponds to a basic logical unit for which payment transaction pattern is to be determined, wherein the payment transaction pattern is associated to a payment date;

computing, by the processor, a payment frequency bucket feature for each of the set of granularity level instance, wherein the payment frequency bucket features corresponds to one of: a weekly payer, alternative weekly payer, a monthly payer, a bi-monthly, a quarterly payer, a half yearly payer and an annual payer;

assigning, by the processor, the set of closed invoices to a set of clusters based on the determined payment frequency bucket features and the data density, wherein each of the set of clusters comprises closed invoices based on the set of payment frequency bucket features and the data density corresponding to each of the set of granularity level instances;

dynamically generating, by the processor, a set of date-shift-payment pattern features based on the determined set of payment frequency bucket features assigned to the set of clusters by shifting a set of invoice level date attributes comprising at least one of: discount date, due date, clearing date and invoice date to a set of reference points on a calendar, wherein each of the set of date-shift-payment pattern features indicates a date on which payment transaction is set to occur for each of the set of open invoices;

determining, by the processor, an optimal pattern from among the generated set of date-shift-payment pattern features with a highest probability of adherence for each granularity level instance using a customer pattern adherence process, wherein determining an optimal pattern from among the generated set of date-shift-payment pattern features, comprises:

determining, by the processor, an adherence evaluation window comprising a lower bound value and an upper bound value;

configuring, by the processor, a specific lookback period for each of the set of date-shift-payment pattern features, wherein the specific lookback period is calculated as a multiple of a time period of a cycle of the respective date-shift-payment pattern feature;

filtering, by the processor, the set of closed invoices that cleared within the configured specific lookback period;

calculate a gap between an actual clearing date and a pattern date predicted by the date-shift-payment pattern feature for the filtered closed invoices;

computing, by the processor, a revenue concentration level within the determined adherence evaluation window by calculating a cumulative sum of the calculated gaps based on revenue percentage; and

selecting, by the processor, the optimal pattern with a maximum revenue concentration level in the adherence evaluation window for each granularity level instance;

predicting, by the processor, a financial transaction payment pattern for the set of open invoices based on the optimal pattern, the set of payment pattern features and the set of granularity level instances by using a financial-transaction-pattern-prediction-based ML model, wherein the financial transaction payment pattern comprises an estimated date at which the one or more customers and the one or more vendors complete a financial transaction to clear the set of open invoices, wherein the financial-transaction-pattern-prediction based ML model uses a regression-based ML model;

pre-processing, by the regression-based ML model, input data comprising the optimal pattern, the set of payment pattern features, and the set of granularity level instances to ensure a format suitable for input into the regression-based ML model;

training, by the regression-based ML model, a set of decision trees using the pre-processed input data to iteratively correct prediction errors for the financial transaction payment pattern;

applying, by the regression-based ML model, at least one of: regularization to prevent overfitting, and encoding of categorical features to eliminate need for extensive pre-processing;

outputting, by the regression-based ML model, a weighted average of the predictions from all the set of decision trees;

dynamically monitoring, by the processor, prediction performance of the regression-based ML model in real time;

identifying, by the processor, instances where the prediction performance decreases below a predetermined threshold;

automatically, by the processor, generating new training data based on the identified instances;

retraining, by the processor, the regression-based ML model using newly generated training data; and outputting, by the processor, the predicted financial transaction payment pattern on the user interface screen of one or more electronic devices associated with an user.

9. The ML-based method of claim 8, wherein the invoice data comprises a set of closed invoices and a set of open invoices, wherein the invoice data comprises customer number, payment terms, invoice date, baseline date, due date, discount due date, clearing date, posting date, invoice type, business unit within a company, invoice amount, discount amount percentage and payment block status, and wherein the set of open invoices corresponds to the invoices associated with payment transactions which are yet to occur, and wherein the set of closed invoices corresponds to the invoices associated with payment transactions previously occurred.

10. The ML-based method of claim 8, wherein determining the optimal pattern from among the generated set of date-shift-payment pattern features with the highest probability of adherence for each granularity level instance using the customer pattern adherence process comprises:

obtaining historical invoice data comprising the payment frequency bucket feature based clustered training data and the set of date-shift-payment pattern features;

estimating a cumulative error distribution value of historical errors for each of the set of date-shift-payment patterns corresponding to each of the set of granularity level instances;

estimating a probability value of adherence for each of the set of date-shift-payment pattern features by comparing each of the set of date-shift-payment pattern features with an actual clearing date based on the estimated cumulative error distribution value of historical errors; and determining the optimal pattern from the set of date-shift-payment pattern, wherein the optimal pattern corresponds to a pattern with highest probability of adherence for each of the set of granularity level instances.

11. The ML-based method of claim 10, wherein estimating the cumulative error distribution value of the historical errors for each of the set of date-shift-payment pattern features corresponding to each of the set of granularity level instances comprises:

determining an adherence evaluation window for a particular customer, wherein the adherence evaluation window comprises a lower bound value and an upper bound value;

determining a lookback period for each of the set of date-shift-payment pattern features, wherein the lookback period is a multiple of a time period of each of the set of date-shift-pattern-features; and determining the cumulative error distribution for each date-shift-payment pattern-feature per granularity level instances, wherein the cumulative error distribution value corresponds to the revenue concentration levels in the determined adherence evaluation window.

12. The ML based method of claim 11, wherein determining the optimal pattern from the set of date-shift-payment pattern comprises:

selecting the optimal pattern with maximum revenue concentration level in the determined adherence evaluation window for a particular granularity level instances based on the determined lookback pattern mapping value.

13. The ML based method of claim 11, wherein estimating the cumulative error distribution value of the historical errors based on the determined lookback pattern mapping value comprises:

filtering the set of closed invoices based on lookback period of the lookback pattern mapping value, wherein the set of closed invoices cleared within the lookback period are filtered;

calculating a gap between clearing date and a pattern date for each of the pattern in the determined lookback pattern mapping value;

calculating a sum amount and a cumulative sum amount for each calculated gap and the granularity level instance;

estimating the cumulative error distribution value of historical errors by calculating the revenue percentage at each stage respective to historical revenue of the granularity level instance in the lookback period; and calculating the revenue concentration levels in the determined adherence evaluation window for each of the customers in the estimated cumulative error distribution value of historical errors.

14. The ML based method of claim 8, wherein predicting the financial transaction payment pattern for the set of open invoices based on the optimal pattern, the set of payment pattern features and the set of granularity level instances by using the financial-transaction-pattern-prediction-based ML model comprises:

applying the determined optimal pattern, the set of payment pattern features and the set of granularity level instances onto the financial-transaction-pattern-prediction-based ML model;

mapping each of the determined optimal pattern, the set of payment pattern features and the set of granularity level instances with the set of open invoices; and predicting the financial transaction payment pattern for the set of open invoices based on the mapping.

15. The ML-based method of claim 8, wherein the ML-based method further comprises:

monitoring the performance of the ML-based computing system in real-time;

identifying instances wherein the performance of the ML-based computing system decreases below a predetermined threshold;

generating a new training data based on the identified instances; and retraining the financial-transaction-pattern-prediction-based ML model using new training data.

16. A non-transitory computer-readable storage medium having instructions stored therein that when executed by one or more hardware processors, cause the one or more hardware processors to execute operations of:

receiving invoice data of at least one of one or more customers and one or more vendors from an external database, wherein the invoice data comprises a set of closed invoices and a set of open invoices along with a set of data attributes;

extracting a set of granularity levels from the received invoice data based on data density, volume, and the set of data attributes, wherein the set of granularity levels comprises at least one of company code, customer number, business unit level, invoice types, and payment terms; and generating a set of granularity level instances based on the extracted set of granularity levels, and wherein each of the set of granularity level instances corresponds to a basic logical unit for which payment transaction pattern is to be determined, wherein the payment transaction pattern is associated to a payment date;

computing a payment frequency bucket feature for each of the set of granularity level instance, wherein the payment frequency bucket features corresponds to one of: a weekly payer, alternative weekly payer, a monthly payer, a bi-monthly, a quarterly payer, a half yearly payer and an annual payer;

assigning, by the processor, the set of closed invoices to a set of clusters based on the determined payment frequency bucket features and the data density, wherein each of the set of clusters comprises closed invoices based on the set of payment frequency bucket features and the data density corresponding to each of the set of granularity level instances;

dynamically generating, by the processor, a set of date-shift-payment pattern features by shifting a set of invoice level date attributes comprising at least one of: discount date, due date, clearing date and invoice date to a set of reference points on a calendar, based on the determined set of payment frequency bucket features assigned to the set of clusters, wherein each of the set of date-shift-payment pattern features indicates a date on which payment transaction is set to occur for each of the set of open invoices;

determining an optimal pattern from among the generated set of date-shift-payment pattern features with a highest probability of adherence for each granularity level instance using a customer pattern adherence process, wherein determining an optimal pattern from among the generated set of date-shift-payment pattern features, comprises:

determining an adherence evaluation window comprising a lower bound value and an upper bound value;

configuring a specific lookback period for each of the set of date-shift-payment pattern features, wherein the specific lookback period is calculated as a multiple of a time period of a cycle of the respective date-shift-payment pattern feature;

filtering the set of closed invoices that cleared within the configured specific lookback period; calculate a gap between an actual clearing date and a pattern date predicted by the date-shift-payment pattern feature for the filtered closed invoices;

computing a revenue concentration level within the determined adherence evaluation window by calculating a cumulative sum of the calculated gaps based on revenue percentage; and selecting the optimal pattern with a maximum revenue concentration level in the adherence evaluation window for each granularity level instance;

predicting a financial transaction payment pattern for the set of open invoices based on the optimal pattern, the set of payment pattern features and the set of granularity level instances by using a financial-transaction-pattern-prediction-based ML model, wherein the financial transaction payment pattern comprises an estimated date at which the one or more customers and the one or more vendors complete a financial transaction to clear the set of open invoices wherein the financial-transaction-pattern-prediction based ML model is a regression-based ML model;

pre-processing, using the regression-based ML model, input data comprising the optimal pattern, the set of payment pattern features, and the set of granularity level instances to ensure a format suitable for input into the regression-based ML model;

training a set of decision trees based on the pre-processed input data to iteratively correct prediction errors for the financial transaction payment pattern, using the regression-based ML model;

applying at least one of: regularization to prevent overfitting, and encoding of categorical features to eliminate need for extensive pre-processing, using the regression-based ML model;

outputting a weighted average of the predictions from all the set of decision trees, using the regression-based ML model;

dynamically monitor prediction performance of the regression-based ML model in real time;

identifying instances where the prediction performance decreases below a predetermined threshold;

automatically generating new training data based on the identified instances;

retrain the regression-based ML model using newly generated training data; and outputting the predicted financial transaction payment pattern on the user interface screen of one or more electronic devices associated with an user.

* * * * *